(12) United States Patent
Moore et al.

(10) Patent No.: US 7,393,491 B2
(45) Date of Patent: Jul. 1, 2008

(54) METHOD FOR PREPARING A TIRE SUPPORT

(75) Inventors: Earl T. Moore, Midland, MI (US); Jeffery D. Zawisza, Midland, MI (US); Kimberly F. Bennett, West Columbia, TX (US)

(73) Assignee: Dow Global Technologies Inc., Midland, MI (US)

( * ) Notice: Subject to any disclaimer, the term of this patent is extended or adjusted under 35 U.S.C. 154(b) by 472 days.

(21) Appl. No.: 10/971,945

(22) Filed: Feb. 23, 2005

(65) Prior Publication Data
US 2006/0061013 A1    Mar. 23, 2006

Related U.S. Application Data

(62) Division of application No. 09/948,171, filed on Sep. 6, 2001, now Pat. No. 6,887,063.

(60) Provisional application No. 60/231,644, filed on Sep. 11, 2000.

(51) Int. Cl.
*B29C 45/40* (2006.01)
(52) U.S. Cl. ................................. 264/328.3; 264/334
(58) Field of Classification Search ............. 264/328.2, 264/328.3, 334
See application file for complete search history.

(56) References Cited

U.S. PATENT DOCUMENTS

| | | | |
|---|---|---|---|
| 3,578,547 A | 5/1971 | Wicker | 161/156 |
| 3,635,851 A | 1/1972 | Hoeschele | 260/2.5 AM |
| 3,897,386 A | 7/1975 | Sanda, Jr. | 260/42.47 |
| 3,915,937 A | 10/1975 | O'Shea | 260/77.5 AM |
| 3,925,319 A | 12/1975 | Hiatt et al. | 260/75 NT |
| 3,932,360 A | 1/1976 | Cerankowski et al. | 260/77.5 AM |
| 3,935,329 A | 1/1976 | Reilley et al. | 427/35 |
| 3,964,328 A | 6/1976 | Redmond, Jr. | 74/231 C |
| 3,979,547 A | 9/1976 | Roberts, Jr. et al. | 428/423 |

(Continued)

FOREIGN PATENT DOCUMENTS

CA    1337448    8/1989

(Continued)

OTHER PUBLICATIONS

Air Free Tires, Inc., SnakeCharmer (websited, Aug. 2001), U.S.A.

(Continued)

*Primary Examiner*—Jill L. Heitbrink

(57) ABSTRACT

A processing mold is suitable for preparing a tire support. One processing mold that is particularly advantageous includes a processing mold having a first mold body opposing a second mold body, and the first and second mold bodies are aligned through a mandrel. In one embodiment, a first mold body includes a locking member suitable for locking the mandrel to the first body. In this embodiment, the mandrel is movable between the first and second mold bodies such that when a processing mold is opened, the first mold body and the mandrel can separate from the second mold body. A method of using a processing mold by aligning a first mold body and a second mold body through a mandrel and a method of releasing a tire support from a processing mold by locking a mandrel to a first mold body and separating the first and second mold bodies are also particularly advantageous.

1 Claim, 18 Drawing Sheets

U.S. PATENT DOCUMENTS

| | | | |
|---|---|---|---|
| 4,048,105 A | 9/1977 | Salisbury | 260/2.5 AC |
| 4,081,429 A | 3/1978 | Wyman et al. | 260/77.5 AB |
| 4,124,574 A | 11/1978 | Preston et al. | 528/76 |
| 4,125,660 A | 11/1978 | White et al. | 428/218 A |
| 4,157,107 A | 6/1979 | Cataldo | 152/330 RF |
| 4,218,543 A | 8/1980 | Weber et al. | 521/51 |
| 4,248,286 A | 2/1981 | Curtiss, Jr. et al. | 152/158 |
| 4,257,994 A * | 3/1981 | Leblanc et al. | 264/102 |
| 4,297,444 A | 10/1981 | Dominguez et al. | 521/160 |
| 4,318,435 A | 3/1982 | Heath-Coleman | 152/158 |
| 4,374,210 A | 2/1983 | Ewen et al. | 521/159 |
| 4,404,353 A | 9/1983 | Slagel | 528/67 |
| 4,408,694 A | 10/1983 | Mueller | 215/276 |
| 4,416,844 A | 11/1983 | Wyman | 264/267 |
| 4,418,734 A | 12/1983 | Dobson | 152/158 |
| 4,461,333 A | 7/1984 | Filliol et al. | 152/158 |
| 4,486,370 A | 12/1984 | Bechara et al. | 264/53 |
| 4,487,869 A | 12/1984 | Panush | 524/90 |
| 4,501,629 A | 2/1985 | Satzler | 156/149 |
| 4,517,249 A | 5/1985 | Panush | 428/463 |
| 4,530,941 A | 7/1985 | Turner et al. | 521/176 |
| 4,573,509 A | 3/1986 | Smith et al. | 152/158 |
| 4,592,403 A | 6/1986 | Stein et al. | 152/158 |
| 4,607,090 A | 8/1986 | Dominguez | 528/48 |
| 4,642,320 A | 2/1987 | Turner et al. | 521/176 |
| 4,694,873 A | 9/1987 | Gerloff et al. | 152/380 |
| 4,732,919 A | 3/1988 | Grigsby, Jr. et al. | 521/159 |
| 4,741,090 A | 5/1988 | Monnier | 29/464 |
| 4,742,090 A | 5/1988 | Hunter et al. | 521/124 |
| 4,751,951 A | 6/1988 | Dobson | 152/520 |
| 4,773,461 A | 9/1988 | Landers et al. | 152/520 |
| 4,806,615 A | 2/1989 | Rice et al. | 528/68 |
| 4,871,413 A | 10/1989 | Hyodo et al. | 156/382 |
| 4,882,411 A | 11/1989 | Grögler et al. | 528/54 |
| 4,953,291 A | 9/1990 | Markow | 29/894.351 |
| 5,000,241 A | 3/1991 | Patecell | 152/382 |
| 5,017,634 A | 5/1991 | Falline et al. | 524/267 |
| 5,022,450 A | 6/1991 | Weeks | 152/381.6 |
| 5,064,875 A | 11/1991 | Grögler et al. | 521/159 |
| 5,115,852 A | 5/1992 | De Lorean | 152/518 |
| 5,130,404 A | 7/1992 | Freeland | 528/52 |
| 5,141,967 A | 8/1992 | Mafoti et al. | 521/159 |
| 5,162,382 A | 11/1992 | Carswell et al. | 521/51 |
| 5,238,973 A | 8/1993 | Mayer et al. | 521/159 |
| 5,247,018 A | 9/1993 | Maeda et al. | 525/193 |
| 5,300,164 A | 4/1994 | DeTrano et al. | 156/116 |
| 5,320,369 A | 6/1994 | Bears | 280/18 |
| 5,326,344 A | 7/1994 | Bramm et al. | 623/3 |
| 5,363,894 A | 11/1994 | Gouttebessis et al. | 152/158 |
| 5,384,161 A | 1/1995 | Eisfeller et al. | 427/250 |
| 5,422,414 A | 6/1995 | Smith | 528/60 |
| 5,450,887 A | 9/1995 | Habay et al. | 152/520 |
| 5,525,681 A | 6/1996 | Barron et al. | 525/403 |
| 5,551,763 A | 9/1996 | Alsman | 301/64.7 |
| 5,634,993 A | 6/1997 | Drieux et al. | 152/158 |
| 5,668,739 A | 9/1997 | League et al. | 382/103 |
| 5,787,950 A | 8/1998 | Muhlhoff et al. | 152/379.5 |
| 5,821,316 A | 10/1998 | Quay et al. | 528/64 |
| 5,868,190 A | 2/1999 | Willard, Jr. et al. | 152/517 |
| 5,891,279 A | 4/1999 | Lacour | 152/520 |
| 5,968,294 A | 10/1999 | Willard, Jr. et al. | 152/158 |
| 5,975,171 A | 11/1999 | Rivaton | 152/158 |
| 6,093,271 A | 7/2000 | Majumdar | 156/116 |
| 6,102,091 A | 8/2000 | Peterson et al. | 152/165 |
| 6,387,311 B1 * | 5/2002 | Lacour et al. | 264/229 |
| 6,767,489 B2 * | 7/2004 | Bracken et al. | 264/83 |

FOREIGN PATENT DOCUMENTS

| | | |
|---|---|---|
| CA | 2067588 | 10/1993 |
| CA | 2262419 | 8/1999 |
| DE | 110839 | 1/1975 |
| DE | 25 53 839 | 12/1976 |
| DE | 350 11 16 A1 | 7/1986 |
| DE | 40 38 996 A1 | 6/1992 |
| DE | 197 28 601 A | 1/1999 |
| EP | 0 130 136 B1 | 8/1987 |
| EP | 0 133 150 B1 | 9/1987 |
| EP | 0 298 854 A1 | 1/1989 |
| EP | 0 408 201 A1 | 1/1991 |
| EP | 0 228 190 B1 | 2/1991 |
| EP | 0 254 193 B1 | 11/1992 |
| EP | 0 513 964 | 11/1992 |
| EP | 0 564 267 A2 | 10/1993 |
| EP | 0 769 527 A1 | 10/1996 |
| EP | 0 666 875 B1 | 3/1997 |
| EP | 0 613 962 B1 | 5/1997 |
| EP | 0 800 913 A1 | 10/1997 |
| EP | 0 617 066 B1 | 1/1998 |
| EP | 0 837 014 | 4/1998 |
| EP | 0 894 648 A2 | 2/1999 |
| EP | 0 937 586 A1 | 8/1999 |
| EP | 0 943 466 A2 | 9/1999 |
| EP | 0 980 771 A2 | 2/2000 |
| EP | 0 985 507 A1 | 3/2000 |
| FR | 2 334 491 | 7/1977 |
| FR | 2 758 844 | 5/2000 |
| GB | 1130520 | 10/1968 |
| GB | 2 094 217 A | 9/1982 |
| JP | S63-270783 | 11/1988 |
| JP | HEI 3-197211 | 8/1991 |
| JP | HEI 6-106556 A | 4/1994 |
| JP | HEI 10-184807 A | 7/1998 |
| JP | 10-258466 * | 9/1998 |
| JP | 00250328 A | 9/2000 |
| WO | WO 94/10213 | 5/1994 |
| WO | WO 98/47728 | 10/1998 |
| WO | WO 99/64260 | 12/1999 |
| WO | WO 00/38937 | 7/2000 |
| WO | WO 01/04200 | 6/2001 |
| ZA | 82/2605 | 4/1982 |

OTHER PUBLICATIONS

Comat, Composite Materials GMBH (website May 2001), Germany.
Entec Composite Machines, Inc., Tape Wrapers (website Aug. 2001), U.S.A.
Entec Composite Machines, Inc., Machinery, FW2000ob Series (website Aug. 2001), U.S.A.
Lin, "Filament Winding: Its Progress and Future in the Aerospace Industry," Plastics & Polymers (Jun. 1968).
Mark et al., Encyclopedia of Polymer Science and Engineering, John Wiley & Sons (1988).
Pultrex Limited, Filament Winding Machines (website Aug. 2001), England.
Sadowski et al., "Polyurethane Latexes for Coagulation Dipping," Elastomerics (Aug. 1978).
Samkwang Corporation, Thermo Paint (website Aug. 2001).
Sidewinder, Sidewinder Filament Winding Systems (wesite Aug. 2001).
Tempil, Inc., Temp-Alarm® Time/Temperature Signaling Paint (website 2001).
Tickle, "Current Cpabilities of Reinforced Plastic pultrusion," SAE (1973).
University of Buffalo, Filament Winding Systmes (website Aug. 2001).
Waring, "Reinforcement," Glass Reinf. Plast., 4th Ed. (1970).
"Method and Device for Preparing a Tire Support," filed in the United States of America, U.S. Appl. No. 60/231,644; Applicant: Moore et al.

* cited by examiner

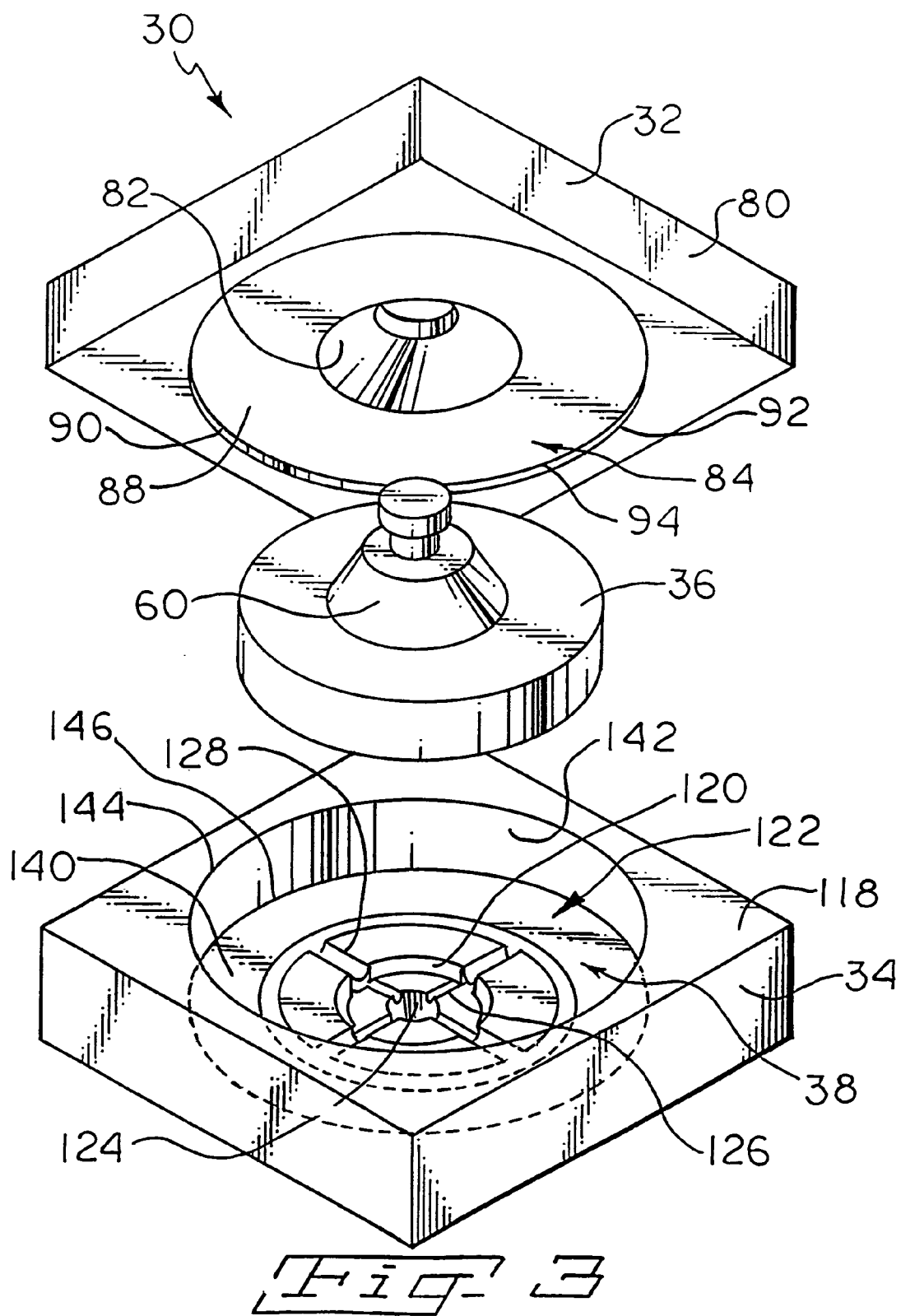

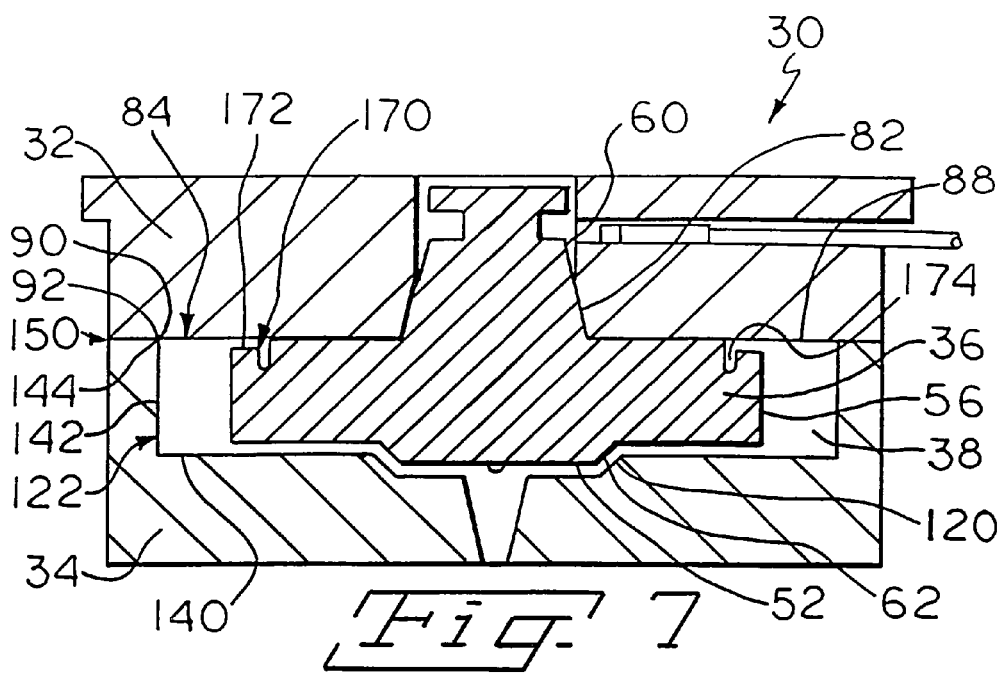
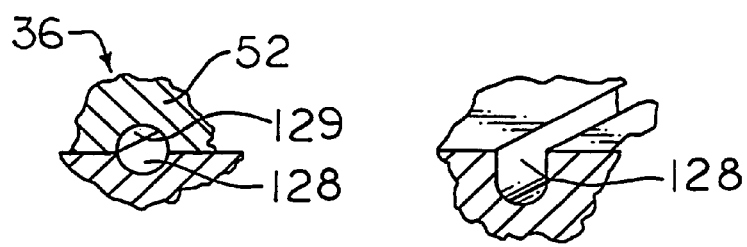
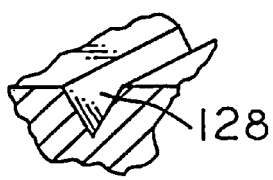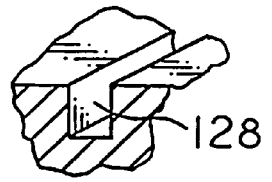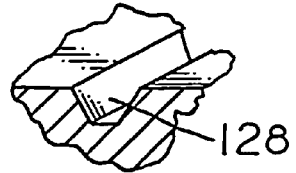

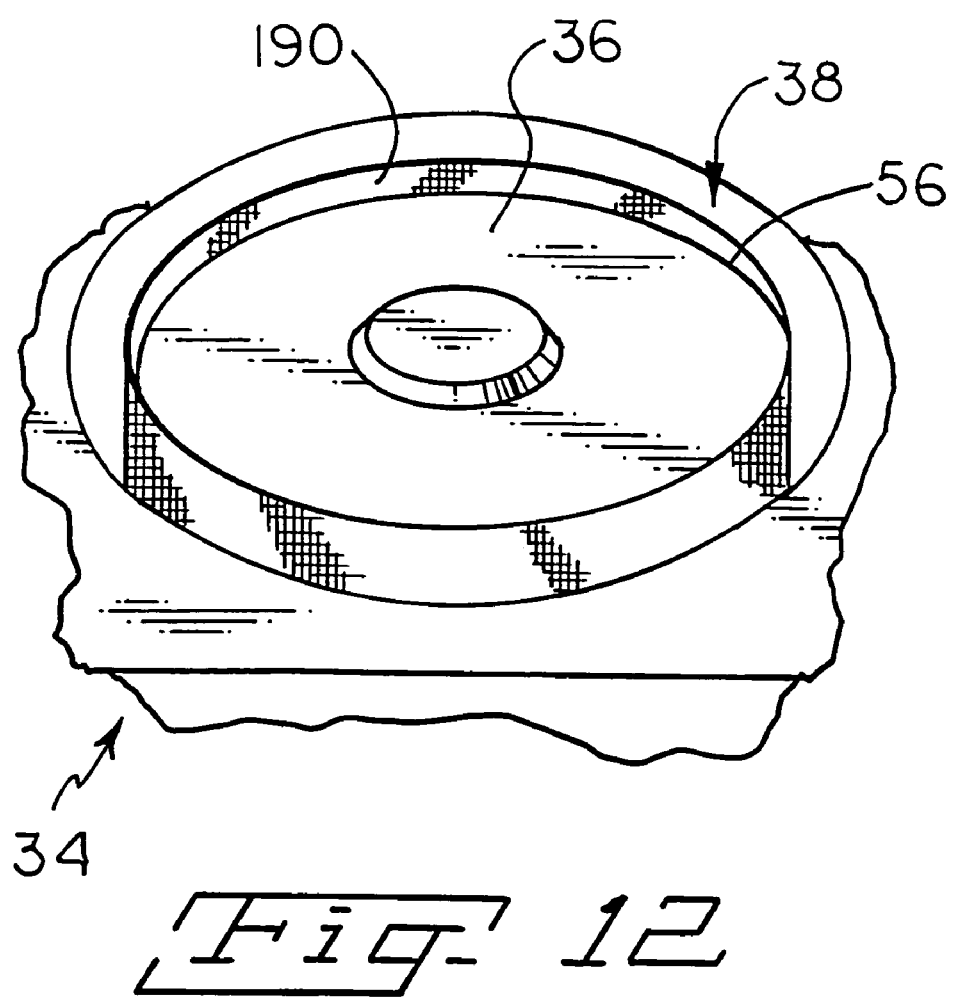

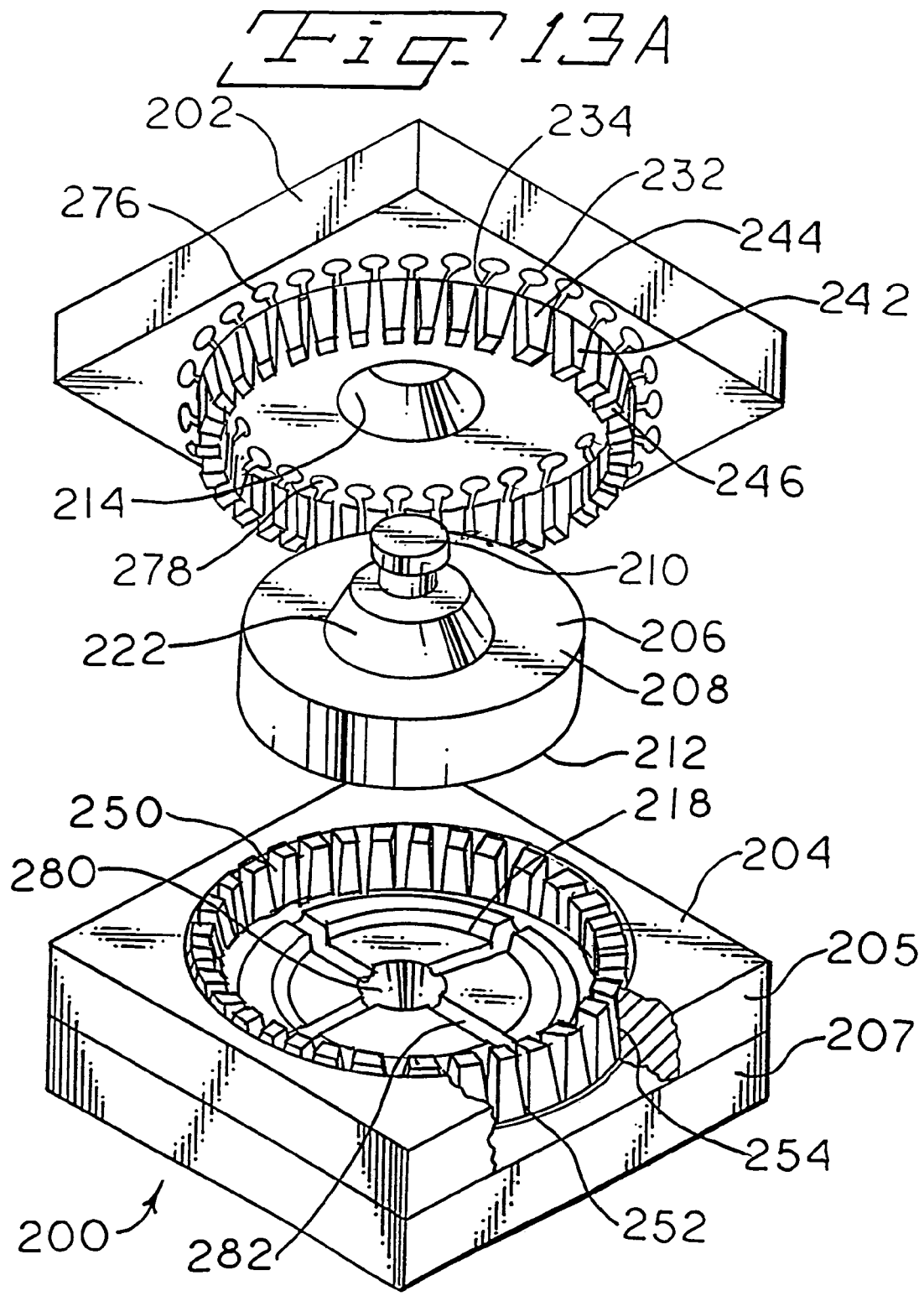

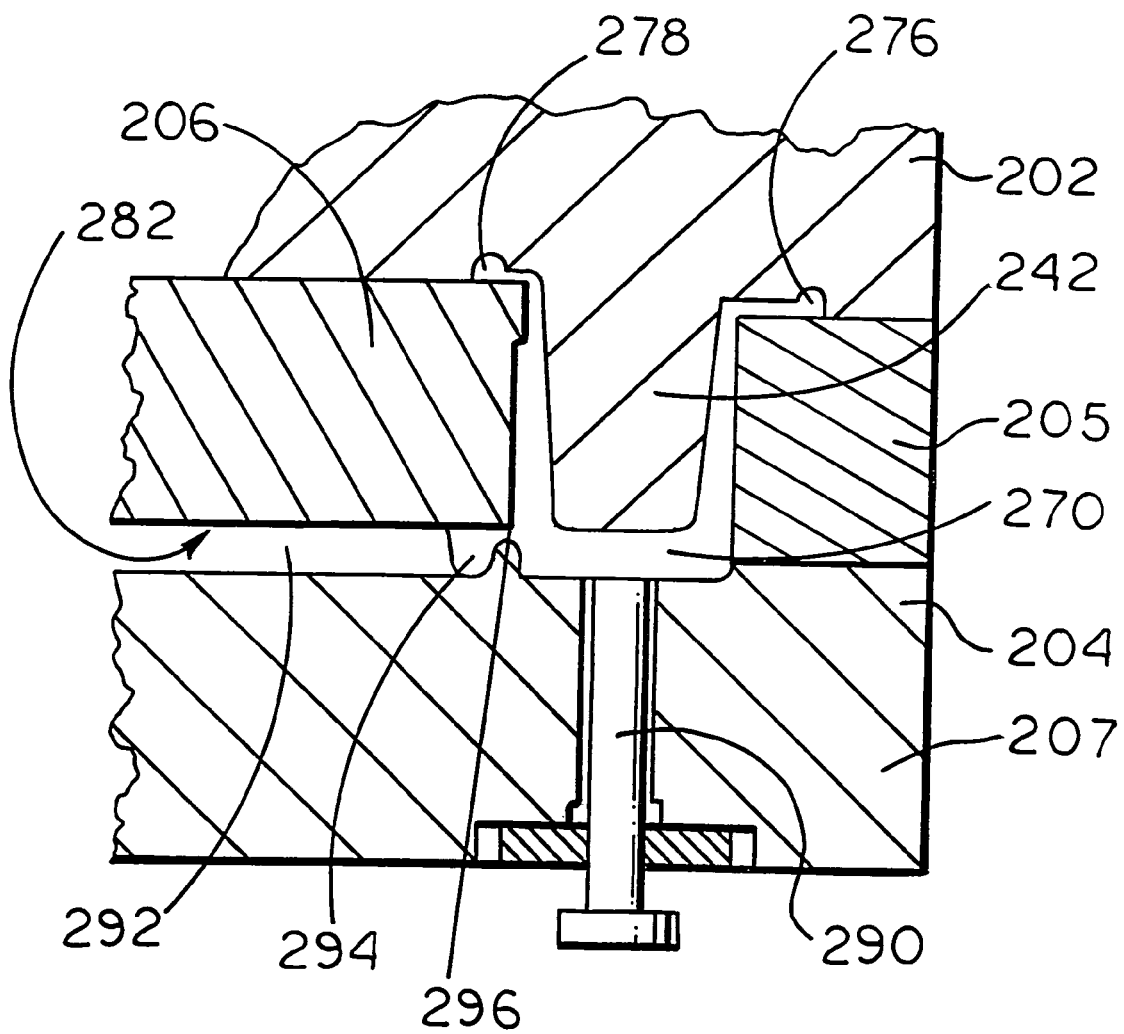

METHOD FOR PREPARING A TIRE SUPPORT

CROSS-REFERENCE TO RELATED APPLICATION

This application is a divisional of application Ser. No. 09/948,171 filed Sep. 6, 2001 now U.S. Pat. No. 6,887,063 which is a original of Provisional application Ser. No. 60/231,644, filed on Sep. 11, 2000 now abandoned.

FIELD OF THE INVENTION

This invention is directed to a method and device for preparing a tire support. More particularly, this invention is directed to using reaction injection molding to prepare a tire support and to a processing mold suitable for use with reaction injection molding to prepare a tire support.

BACKGROUND OF THE INVENTION

A tire support for a vehicle tire is a support suitable for being mounted on a wheel rim inside of a tire. A tire support is a precautionary device against a tire losing air pressure, and it is intended to bear the weight of a vehicle if a tire loses partial or total air pressure to the extent that loss of vehicle control or irreparable damage to the tire might occur by continued use of the vehicle without the tire support. Tire supports are known and described in, for example, U.S. Pat. No. 5,891,279.

A tire support is desirable because it can replace a spare tire to enable a vehicle to continue traveling to a service facility where inflation, repair, or replacement of an at least partially-deflated tire can be accomplished. This is advantageous for improving vehicle storage space by removing the necessity for storing a spare tire and a jack, for reducing the overall weight of a vehicle to improve fuel economy, and for reducing the likelihood of additional vehicle damage when a vehicle continues after a tire loses air pressure.

A tire support can be prepared by molding a polymeric material in a device, i.e., a mold, configured for a tire support. Examples of molding processes that have been used include centrifugal molding and reaction injection molding (RIM). Centrifugal molding is typically less than desirable for preparing a tire support because it can be prohibitively expensive for commercial application. For example, centrifugal molding can require extended processing times.

RIM is typically more desirable for processing a tire support because RIM can require less processing time than centrifugal molding, which can decrease production cost.

Processing times for centrifugal molding or RIM molding can be affected by how easily a tire support can be removed from a mold. For example, it may be difficult to remove a tire support from a mold because portions of the tire support may constrict against a mold surface as well as pull away from another mold surface due to the material shrinking as it sets or cures. This can slow down production, subsequently increasing production expense. Similarly, a tire support can indiscriminately stick to an upper or lower portion of a mold when the upper and lower portions are separated. Not only can this slow down production, but it can result in a damaged tire support if a tire support remains with the upper portion during separation and then later releases from the upper portion, subsequently striking the lower portion of the mold, floor, or both.

Thus, it is desirable to develop a method and a device that facilitate release of a tire support from a mold.

SUMMARY OF THE INVENTION

The invention is directed to a method and device for preparing a tire support. A device for preparing a tire support is a processing mold. A processing mold of the invention is suitable for preparing a tire support having a wheel-rim surface, a tread-support surface surrounding the wheel-rim surface, and an internal configuration between the tread-support surface and the wheel-rim surface.

A processing mold of the invention includes a first mold body opposing a second mold body, and the first and second mold bodies are aligned with a mandrel.

In one embodiment, a mandrel has a longitudinal axis and a diametrical axis. The mandrel includes a first end and a second end spaced along the longitudinal axis. The first end includes a first mold-body contact, and the second end includes a second mold-body contact. The mandrel also includes a mandrel body that longitudinally interconnects the first and second ends of the mandrel. The mandrel body includes a mandrel wall that defines the outer dimension of the mandrel body, which is along the diametrical axis of the mandrel. The mandrel wall is suitable for defining the wheel-rim surface of the tire support.

Also in this embodiment, a first mold body includes a first mold support and a first mandrel contact that is engaged with the first mold-body contact of the mandrel to form a first engagement.

Also in this embodiment, a second mold body includes an inlet for receiving fluid polymeric or prepolymeric material. The second mold body also includes a second mandrel contact that is engaged with the second mold-body contact of the mandrel. The second mandrel contact is adjacent to the inlet and includes a distribution port in fluid communication with the inlet. The second mold body further includes a second mold support.

In this embodiment, the first mold support, the second mold support, or both are suitable for defining the tread-support surface of the tire support.

Also in this embodiment, the mandrel wall, the first mold support, and the second mold support define a tire-support region suitable for molding a tire support.

One advantage of a processing mold of the invention is that the mandrel is movable between the first and second mold bodies. In one embodiment, the first mold body further comprises a locking member operably connected to the first engagement between the mandrel and the first mold body.

In another embodiment, a processing mold of the invention includes a tire-support reinforcement removably positioned around the mandrel wall and at least partially within the second mold body. The reinforcement is suitable for being molded into a tire support.

A processing mold of the invention can include tire-support members to form a tire support that has a ribbed internal configuration.

One embodiment of the invention includes a kit suitable for assembling at least a portion of the processing mold of the invention. That is, a kit can include any combination of a mandrel, a first mold body, and a second mold body, but all three components need not be included in the kit.

The invention is also directed to a method for preparing a tire support. One method of the invention is directed to aligning a first mold body and a second mold through a mandrel, clamping the aligned mold bodies, injecting polymeric material into the clamped mold, forming a tire support, and removing a tire support from the second mold body.

The invention is also directed to a method of releasing a tire support from a processing mold of the invention. One method of the invention is directed to injecting polymeric material into a processing mold, forming a tire support, locking a mandrel to a first mold body, parting the first and second mold bodies, and ejecting the tire support from the second mold body.

In one embodiment, the release of the tire support can be further facilitated by adding draft to a processing mold or by adding an ejection force by a stripper plate or ejector pins.

BRIEF DESCRIPTION OF THE DRAWINGS

FIG. 3 is an exploded perspective view that illustrates the processing mold of FIG. 1 having the first mold body, the mandrel, and the second mold body separated from each other.

FIG. 7 illustrates another embodiment of a processing mold of the invention taken along the cross section shown in FIG. 1B.

FIGS. 8A-8E illustrate various configurations for channels.

FIG. 12 illustrates a perspective view second mold body and a mandrel of a processing mold of the invention that includes a structural reinforcement around the mandrel.

FIG. 13A is an exploded perspective view that illustrates another embodiment of a processing mold of the invention having the first mold body, the mandrel, and the second mold body separated from each other.

FIG. 13D illustrates an enlarged partial cross section of a processing mold similar to FIG. 13C.

DETAILED DESCRIPTION OF THE INVENTION

This invention is directed to a method and device for preparing a tire support. More particularly, the invention is directed to using reaction injection molding (RIM) to prepare a tire support. The invention is also directed to a processing mold suitable for use with reaction injection molding to prepare a tire support.

A tire support includes any device suitable for being placed in contact with a wheel rim to provide support to a vehicle, for example, a car, a truck, a bus, a trailer, a motorcycle, a recreation vehicle, or an aircraft, during run-flat conditions. Run-flat conditions include any condition in which tire air pressure is less than desirable for driving conditions, for example, when a tire loses partial or total air pressure and loss of vehicle control or irreparable tire damage may occur by continued use of the vehicle without the tire support.

Figure 2A:
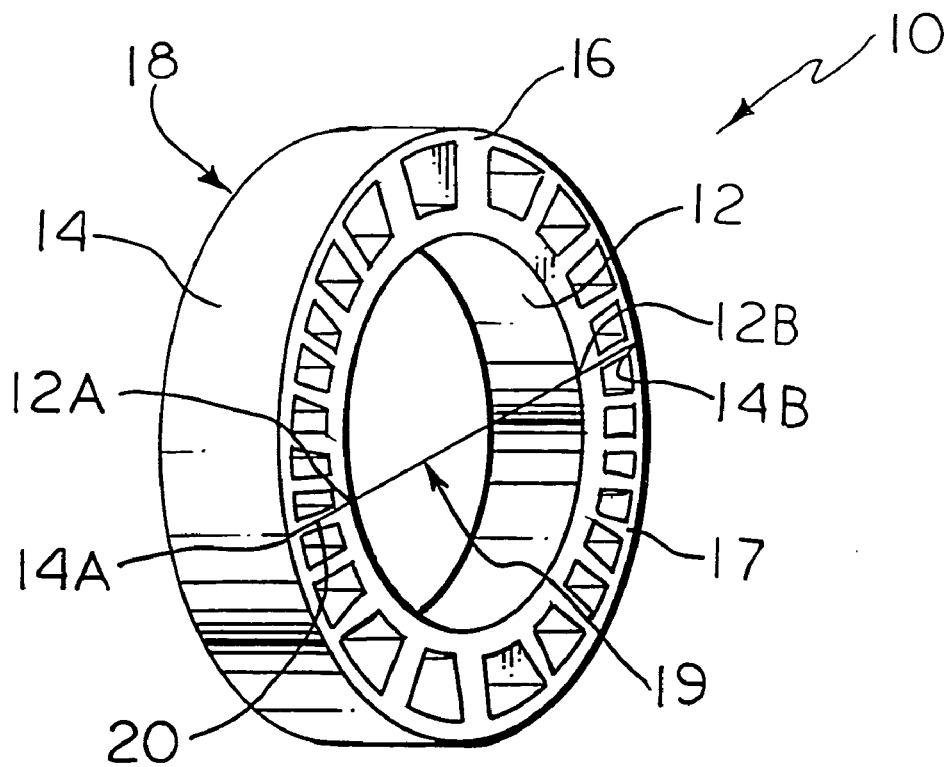
FIG. 2A is a perspective view that illustrates one example of a tire support that can be prepared in a processing mold of the invention.

One type of tire support 10 is illustrated in FIG. 2A. FIG. 2A shows a tire support 10 having a wheel-rim surface 12 and a tread-support surface 14. The tread-support surface 14 surrounds the wheel-rim surface 12, and an internal configuration 16 is between the wheel-rim surface 12 and the tread-support surface 14.

The internal configuration 16 has a first side 17 and a second side 18. The tire support 10 has an inner dimension 19 defined by the wheel-rim surface 12 between 12A and 12B and an outer dimension 20 defined by the tread-support surface 14 between 14A and 14B. The inner dimension 19 and the outer dimension 20 are substantially coaxial and typically substantially bisect a first side 17, a second side 18, a tread-support surface 14, or a wheel-rim surface 12.

Figure 2B:
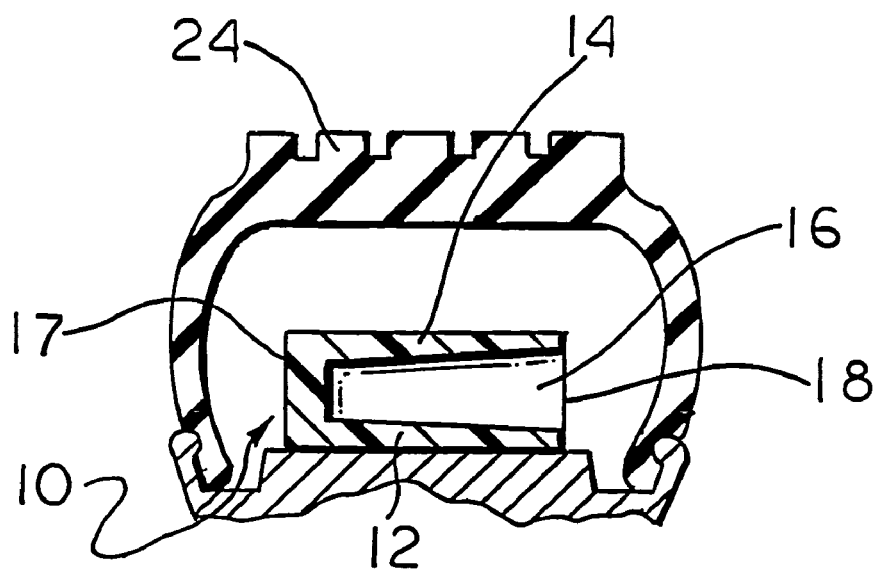
FIG. 2B is a cross-sectional view that illustrates one example of a tire support applied to a wheel rim.

FIG. 2B illustrates a cross-sectional view of the tire support 10 of FIG. 2A between a wheel rim 12 and a tire 24.

To illustrate the invention, reference will be made to the tire support shown in FIG. 2A. Any such reference is intended for illustration purposes only and is not meant to limit the invention according to the tire-support embodiment of FIG. 2A.

Processing Mold

A processing mold of the invention includes a device suitable for preparing a tire support. That is, a processing mold of the invention includes a device that can shape a material into a tire support. The terms "prepare" and "preparing" include, for example, casting, molding, forming, and shaping.

A processing mold of the invention can be configured and arranged in a closed position or in an open position. For example, a processing mold of the invention is typically arranged in a closed position when preparing a tire support. That is, a tire support is enclosed by the processing mold of the invention. Conversely, a processing mold of the invention is typically arranged in an open position when removing a tire support or when inserting a tire-support reinforcement into a processing mold. For clarity and consistency, all further description of the processing mold of the invention refers to the processing mold being in a closed position unless specified to the contrary. One skilled in the art having read this specification will appreciate the configuration and arrangement of a processing mold of the invention in an open position relative to a closed position.

Figure 1A:
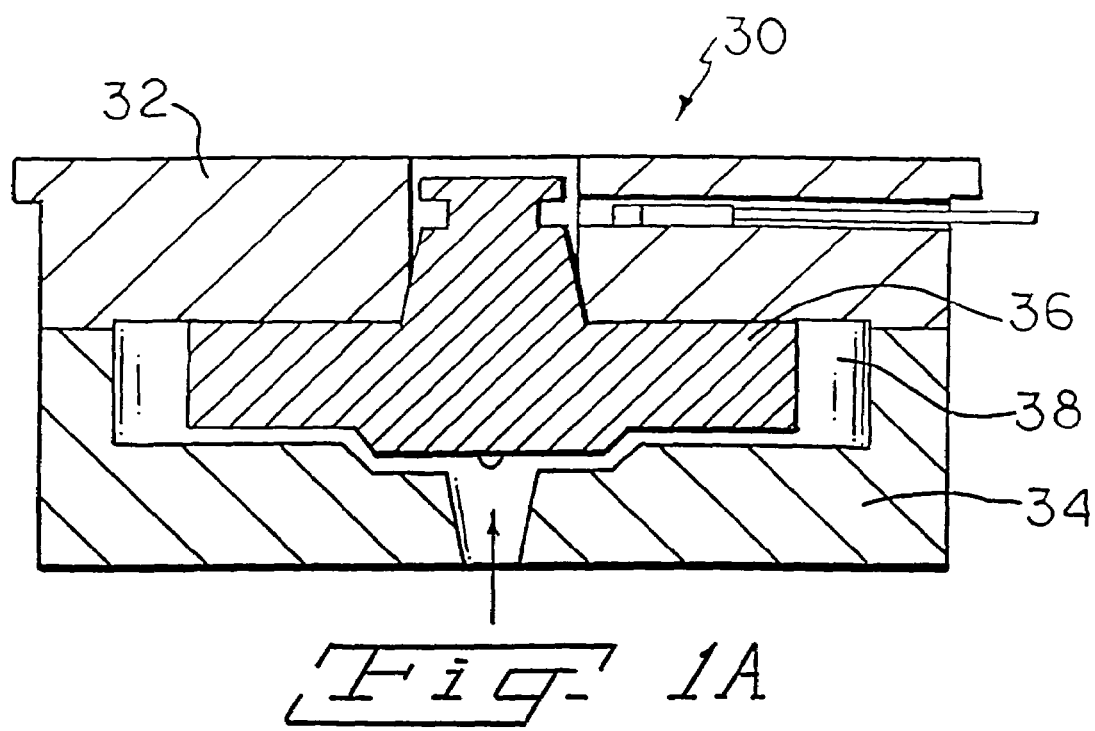
FIG. 1A is a cross-sectional view that illustrates a general processing mold of the invention. The cross section is taken along line 1A in FIG. 1B.

A cross section of a processing mold of the invention is generally shown in FIG. 1A. The cross section is taken along line 1A shown in FIG. 1B.

Figure 1B:
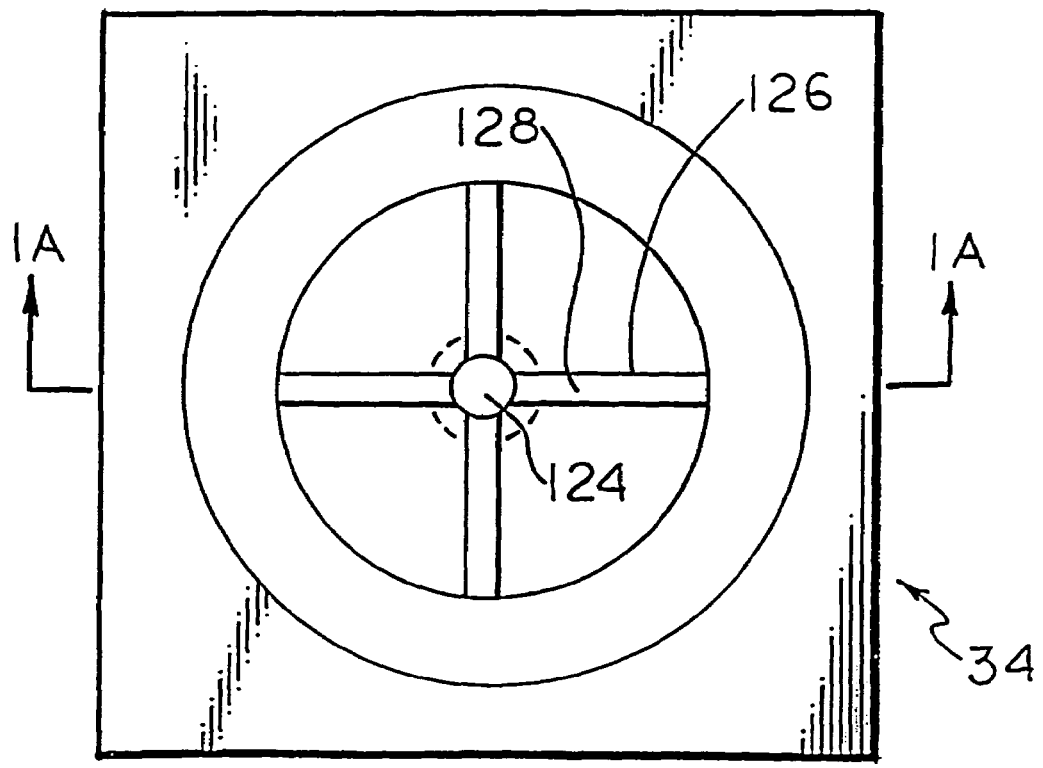
FIG. 1B is a plan view of a second mold body included in the general processing mold of FIG. 1A.

FIG. 1A shows that a processing mold 30 includes a first mold body 32 opposing a second mold body 34 and also includes a mandrel 36 extending between the first and second mold bodies 32, 34. At least a portion of the first mold body 32, at least a portion of the second mold body 34, and at least a portion of the mandrel 36 define a tire-support region 38. FIG. 1B illustrates a plan view of the second mold body 34 included in the processing mold 30 of FIG. 1A.

An exploded view of the processing mold of FIG. 1A is generally shown in FIG. 3. Like reference numerals in the Figures represent like parts and assemblies.

A first mold body, a second mold body, and a mandrel can be constructed from any material suitable for operating at temperatures and pressures typically used when preparing a tire support and for being substantially nonreactive with a polymeric material used for the tire support. Suitable materials for constructing a first mold body, a second mold body, or a mandrel include, for example, aluminum, steel, magnesium, nickel, beryllium copper, polymeric materials, and any combination of these materials.

A first mold body, a second mold body, a mandrel, or a combination of these components can include a temperature device, for example, a temperature sensor such as a thermostat, a temperature controller such as a heating system, for example, a device for circulating heated oil, or both. Any of these components can also include a pressure device, for example, a pressure sensor.

One advantage of a processing mold of the invention includes the mandrel 36 being movable between the first mold body 32 and the second mold body 34. By being movable, the mandrel can be attached to or preferably engaged with the second mold body when a processing mold of the invention is open, or the mandrel can be attached to or preferably engaged with the first mold body when a processing mold of the invention is open. The aspects of this invention that contribute to the movability of the mandrel will be further described below.

Another advantage of a processing mold of the invention includes aligning the first mold body 32 and the second mold body 34 with the mandrel 36. The terms "alignment," "align," and "aligning" mean that the processing mold is positioned such that it produces a tire support 10 having an inner dimension 19 and an outer dimension 20 that are substantially coaxial and substantially bisect a first side 17, a second side 18, a tread-support surface 14, or a wheel-rim surface 12. This increases the uniformity from tire support to tire support as each tire support is molded, as compared to a processing mold that does not have alignment with a mandrel. The term "uniformity" refers to the consistency of the structure, e.g., the dimensions, from tire support to tire support. The aspects of the invention that contribute to the alignment of the first and second mold bodies 32, 34 with the mandrel 36 will be further described below. The alignment of the first mold body 32 and the second mold body 34 with the mandrel 36 can be assisted by conventional alignment components such as leader pins and bushings. Such alignment components can be included in at least one of the first mold body 32, the second mold body 34, or the mandrel 36.

Mandrel

Figure 4A:
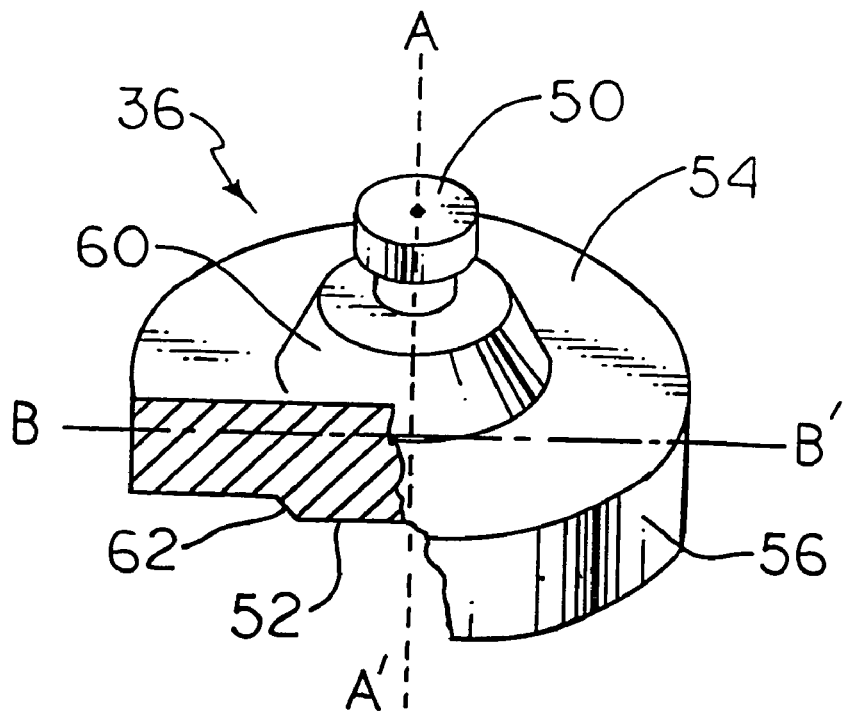
FIG. 4A is a sectional view that further illustrates the mandrel of FIG. 3.

A mandrel includes any device suitable for defining the wheel-rim surface of a tire support. One example of a mandrel is shown in FIG. 4A. A mandrel 36 typically includes a first end 50 and a second end 52 that are spaced along a longitudinal axis A-A' and longitudinally interconnected by a mandrel body 54. The mandrel body 54 includes a mandrel wall 56. In one embodiment shown in FIG. 4A, the mandrel wall 56 is substantially coaxial with the longitudinal axis A-A'.

Figure 4B:
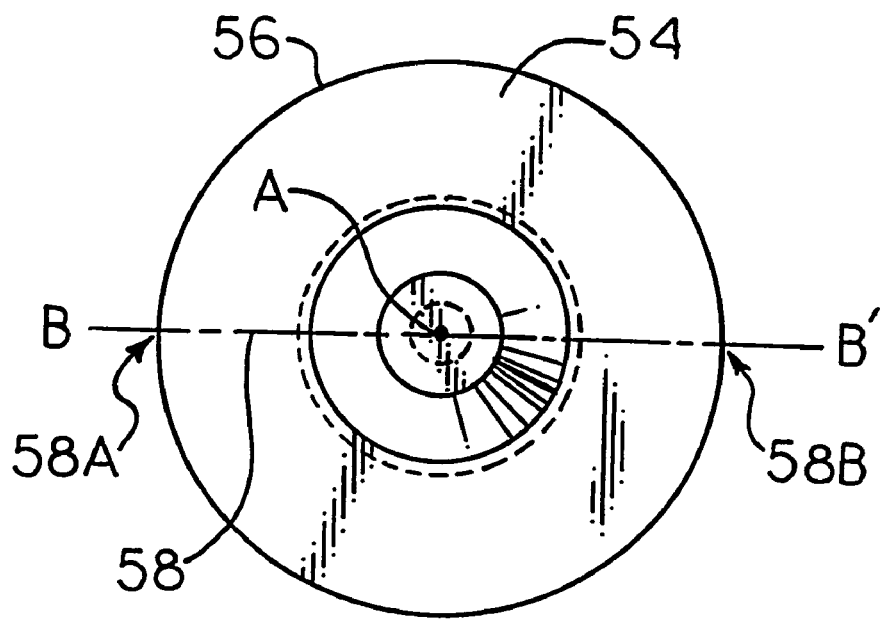
FIG. 4B is a plan view of the mandrel of FIG. 4A and shows diametrical axis B-B'.

FIG. 4B is a plan view of FIG. 4A and shows that the mandrel wall 56 provides an outer boundary for the mandrel body 54, which provides an outer dimension 58 between 58A and 58B along a diametrical axis B-B' of the mandrel body 54. The outer dimension 58 corresponds to the inner dimension of the tire support, for example, inner dimension 19 of tire support 10 in FIG. 2A.

A mandrel can have any shape suitable for providing the wheel-rim surface of a tire support. For example, a mandrel can be shaped as a cylinder, a cylinder tapered at one or both ends, a plurality of cylinders, or any combination of these shapes that can provide the inner dimension of a tire support. The mandrel wall 56 is not limited to being straight but can be stepped, concave, convex, a combination of these configurations, or any other configuration that can provide a desirable wheel-rim surface. A desirable wheel-rim surface includes any configuration suitable for being applied to a wheel rim.

One skilled in the art having read the specification will appreciate that the mandrel is not limited to a substantially perfect geometric shape. The mandrel can include some processing imperfections or can be configured and arranged in any manner that allows the mandrel wall 56 to provide a wheel-rim surface of a tire support.

Figure 11A:
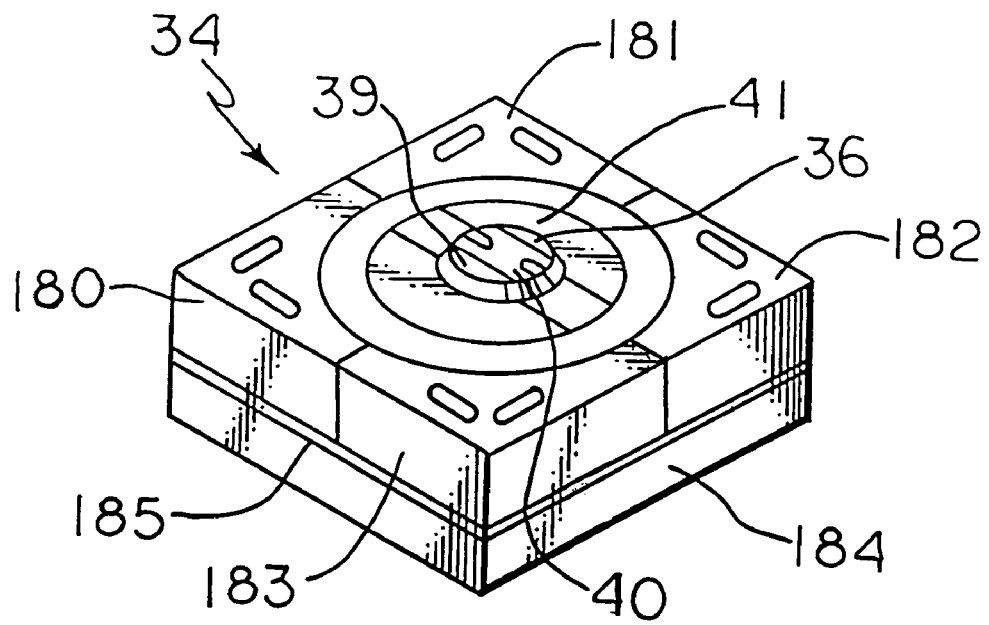
FIG. 11A illustrates a perspective view of one embodiment of a second mold body that is engaged with a mandrel.

A mandrel can be continuous or can be formed from multiple mating components. FIG. 1A illustrates a continuous mandrel. FIG. 11A shows one embodiment of a mandrel 36 having 3 mating components 39, 40, 41. These components can be attached by, for example, a screw or a bolt.

A mandrel can be hollow, solid, or partially solid. In one embodiment, the mandrel is solid.

In another embodiment, a mandrel is partially solid and includes an overflow chamber suitable for receiving excess polymeric material. Excess polymeric material includes any amount of polymeric material that is greater than the amount of polymeric material effective for preparing a tire support. The overflow chamber will be further described below.

In another embodiment, a mandrel includes a plaque reservoir suitable for preparing a plaque that can be used in, for example, quality-control testing. The plaque reservoir will be further described below.

A mandrel 36 typically interconnects a first mold body 32 and a second mold body 34 as shown in FIG. 1A. The term "interconnects" includes, for example, extending between, joining, attaching, and aligning.

FIG. 4A also shows that a first end 50 of a mandrel 36 can include a first mold-body contact 60 and a second end 52 of a mandrel 36 can include a second mold-body contact 62 to facilitate this interconnection. A mold-body contact includes any configuration suitable for engaging at least a portion of a mold body. The term "engaging" as used herein includes, for example, interlocking, meshing, holding, securing, meeting, or joining. These contacts will be further discussed below.

First Mold Body

A first mold body includes any device suitable for shaping a first portion of a tire support. One example of a first mold body 32 is shown in FIG. 3. A first mold body 32 includes at least one mold plate 80. In one embodiment shown in FIG. 3, a first mold body 32 includes one mold plate 80 that is suitable for shaping a first portion of a tire support.

A first mold body 32 includes a first mandrel contact 82 and a first mold support 84.

A mandrel contact includes any configuration that is complementary to a mold-body contact of a mandrel 36 and is suitable for engaging at least a portion of a first end 50 of a mandrel 36 or a second end 52 of a mandrel 36. That is, a mandrel contact and a mold-body contact can have, for example, a lock-and-key configuration, a peg-in-a-hole configuration, a disk-in-a-slot configuration, or any other suitable male-female configuration.

A mandrel contact can be, for example, a taper acceptor, a tapered member, a cylinder acceptor, a cylindrical member, a cube acceptor, a cubical member, a channel, a rectangular member, an annular groove, or an annular member. These configurations can also include alignment components such as keys or alignment pins. The terms "member" and "acceptor" refer to complementary components, for example, male-female components. A mold-body contact is complementary to the corresponding mandrel contact.

A first mandrel contact 82 is complementary to a first mold-body contact 60 of a mandrel 36 and is suitable for engaging at least a portion of a first end of a mandrel.

In one embodiment shown in FIG. 3, a first mandrel contact 82 includes a taper acceptor, and a first mold-body contact 60 of a mandrel 36 includes a tapered member.

In another embodiment, a first mandrel contact includes a cylinder acceptor, and a first mold-body contact of a mandrel includes a cylindrical member.

A first mold body also includes a first mold support 84. A mold support includes any configuration and arrangement suitable for providing at least a portion of a tire support. A mold support includes at least a support end but typically includes a support end and a support wall.

A support end includes any configuration suitable for defining a side of a tire support, for example, a first side 17 or a second side 18 of a tire support 10 as shown in FIG. 2A. A support end can be, for example, configured as a washer shape or a disk shape.

A support wall includes any configuration suitable for defining at least a portion of a tread-support surface of a tire support, for example, tread-support surface 14 of a tire support 10 as shown in FIG. 2A. A support wall can be, for example, configured as annular, circular, cylindrical, or elliptical.

A support wall is typically circumferentially spaced from a mandrel wall. The term "circumferentially spaced" as used herein includes surrounding, forming a ring around, or enclosing. One skilled in the art having read this specification will appreciate that the support wall is not limited to a perfect geometric shape but includes any shape suitable for providing at least a portion of a tread-support surface, for example tread-support surface 14 in FIG. 2A.

FIG. 3 illustrates a first mold body 32 including one mold plate 80 and a first mold support 84. A first mold support 84 includes a first support end 88 and a first support wall 90. A second end 92 of the first support wall 90 is spaced between a first end 94 of the first support wall 90 and a second mold body 34. The first support end 88 interconnects a first mandrel contact 82 and a first end 94 of a first support wall 90.

In still another embodiment, the first mold body 32 includes a first mold support 84 that includes a first support end 88 but is free of a first support wall.

A first support end 88 can be suitable for preparing at least a portion of an internal configuration of a tire support, for example, internal configuration 16 of a tire support 10 shown in FIG. 2A. An internal configuration of a tire support is suitable for providing at least one of strength, compliance, or durability to a tire support such that the tire support does not collapse when relied on for a limited duration during run-flat conditions. An internal configuration can be solid or ribbed.

Figure 5A:
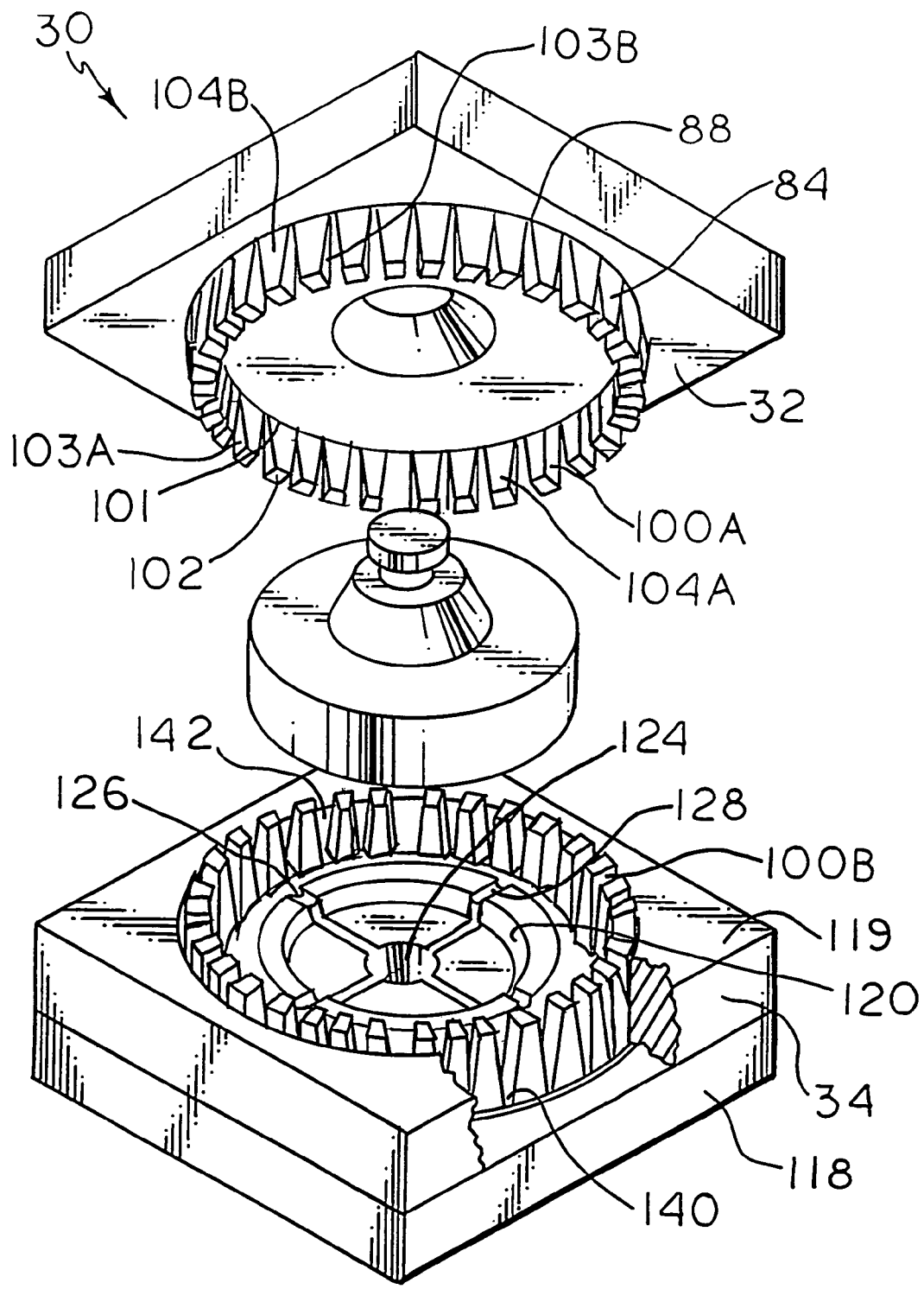
FIG. 5A is an exploded view that illustrates one embodiment of a processing mold of the invention.

To prepare a tire support with an internal configuration that is ribbed, as shown is FIG. 5A, a first support end 88 can include a first tire-support member 100A, and preferably a plurality of tire-support members that are uniformly spaced about the circumference of the tire-support region. A tire-support member can include, for example, a trapezoidal pillar, an orthorhombic pillar, a strut, a cylindrical pillar, an ellipsoid pillar, or a combination of these structures. A tire-support member is not limited to having straight sides but can have concave sides, convex sides, curved sides, stepped sides, or any other configuration suitable for making an internal configuration of a tire support.

Figure 5B:
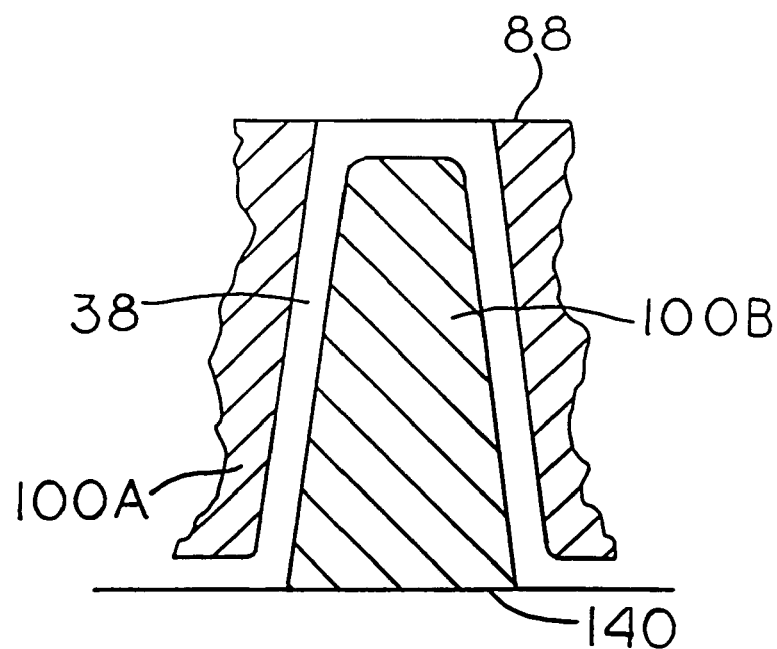
FIG. 5B illustrates a cross-sectional view of one embodiment of tire-support members in a closed processing mold of the invention.
Figure 5C:
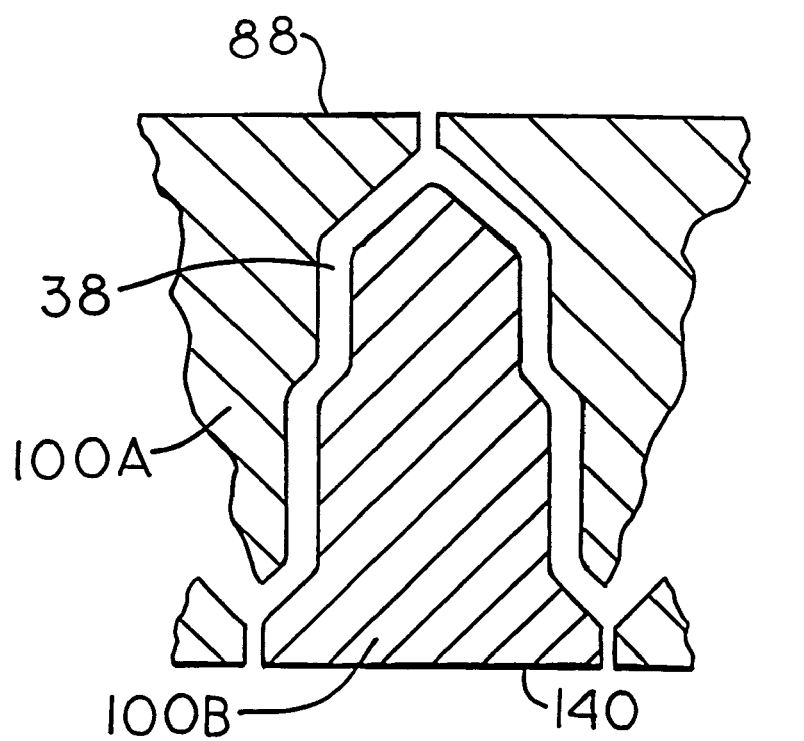
FIG. 5C illustrates another embodiment of tire-support members having the same view as FIG. 5B.

FIGS. 5B and 5C illustrate two embodiments of tire-support members in a closed mold. These Figures will be addressed further when the second mold body 34 is further discussed.

Figure 6A:
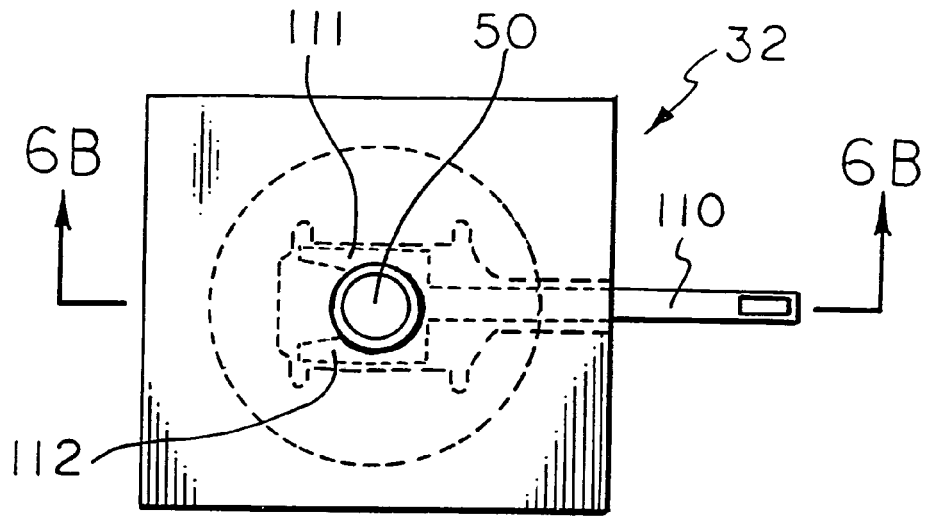
FIG. 6A illustrates a plan view of one embodiment of a first mold body including a locking member suitable for locking a mandrel to a first mold body of a processing mold of the invention.
Figure 6B:
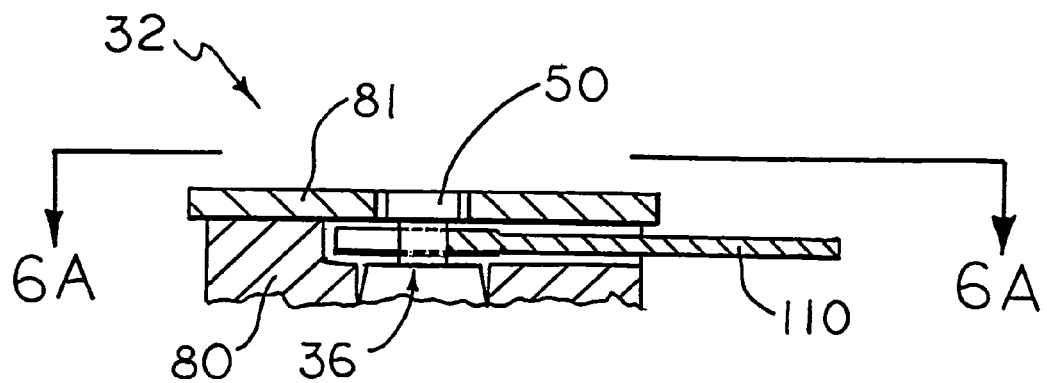
FIG. 6B illustrates a cross-sectional view of the embodiment shown in FIG. 6A taken along line 6B.
Figure 6C:
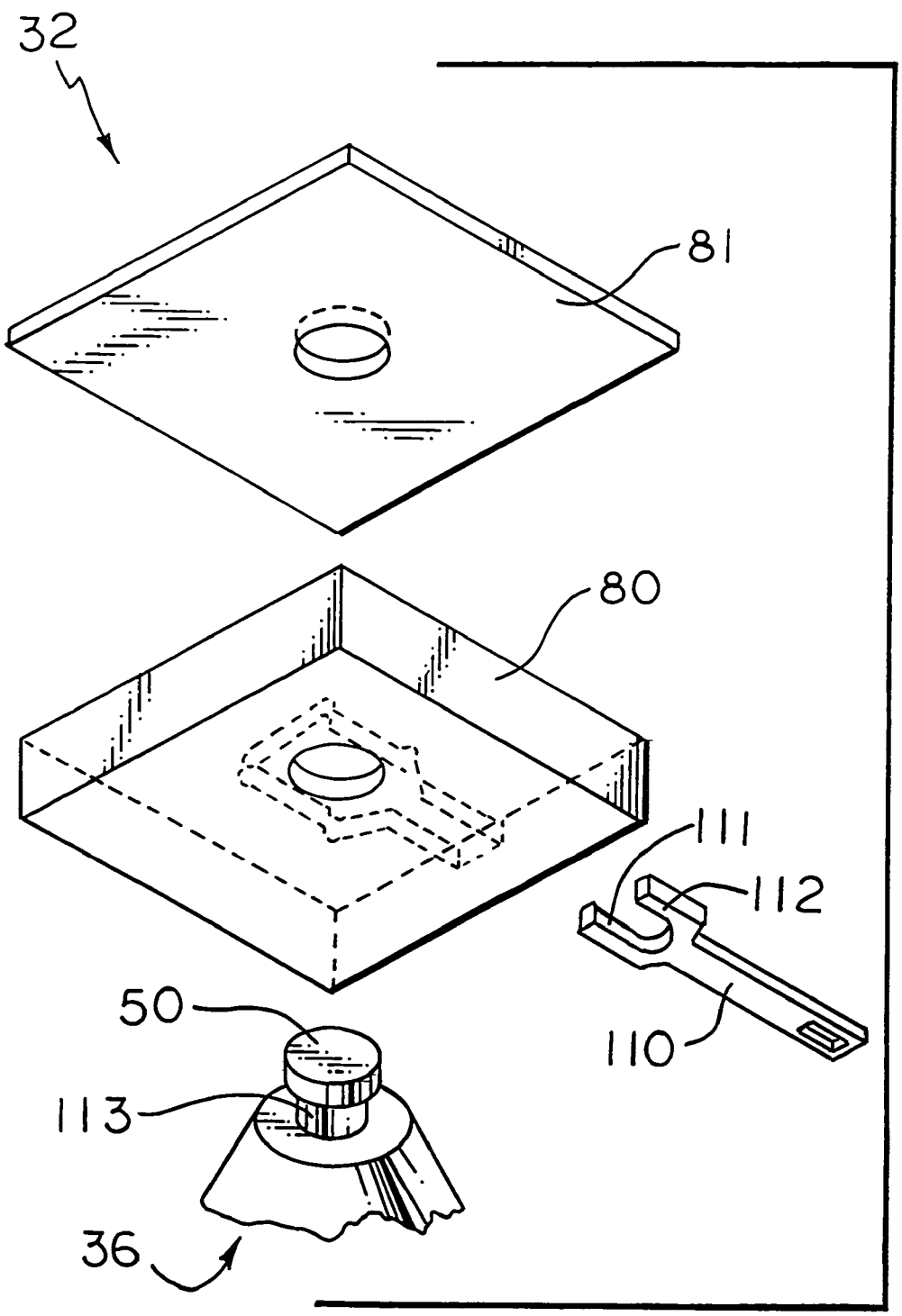
FIG. 6C illustrates an exploded view of the embodiment shown in FIG. 6A.

FIGS. 6B and 6C show another embodiment of a first mold body. In this embodiment, a first mold body 32 includes two mold plates 80, 81. These plates can be attached by, for example, a bolt, a screw, or a combination of these attachments.

A first mold body can also include a locking member operably connected to a first mandrel contact. A locking member includes any device suitable for securing the mandrel to the first mold body through the first mandrel contact of the first mold body and the first mold-body contact of the mandrel.

In one embodiment shown in FIGS. 6A-C, a locking member 110 is a retractable fork having first and second prongs 111, 112. To lock the mandrel 36 to the first mold body 32, the first and second prongs 111, 112 slide into a groove 113 included in the first end 50 of the mandrel 36. To release the mandrel 36 from the first mold body 32, the fork 110 can be retracted by disengaging the first and second prongs 111, 112 from the groove 113.

One advantage of a first mold body 32 that includes a locking member 110 is that a mandrel 36 can be secured to a first mold body 32 when a first mold body 32 is separated from a second mold body 34 (that is, a processing mold of the invention is opened). Alternatively, a mandrel 36 can be released from a first mold body 32 when a first mold body 32 is separated from a second mold body 34, which allows a mandrel 36 to remain engaged with a second mold body 34.

Second Mold Body

A second mold body includes any device suitable for shaping a second portion of a tire support. One example of a second mold body 34 is shown in FIG. 3. A second mold body 34 includes at least one mold plate 118. In one embodiment shown in FIG. 3, a second mold body 34 includes one mold plate 118 that is suitable for shaping a second portion of a tire support.

In another embodiment shown in FIG. 11A, a second mold body includes six mold plates, and the combination of the six mold plates shape a second portion of a tire support. This embodiment will be described further below. One skilled in the art having read this specification will recognize how to make and design a second mold body with six mold plates.

It can be advantageous for a mold body (either a second mold body or a first mold body) to include one mold plate because it can be more quickly assembled than a mold body with more than one mold plate. It can also be advantageous for a mold body to include one mold plate because there are fewer seams in which polymeric material can collect.

A second mold body 34 includes a second mandrel contact 120, a second mold support 122, an aperature defining an inlet 124, and a distribution port 126.

A mandrel contact is as defined above. A mandrel contact includes any configuration that is complementary to a mold-body contact of a mandrel 36 and is suitable for engaging at least a portion of a first end 50 of a mandrel 36 or a second end 52 of a mandrel 36. That is, a mandrel contact and a mold-body contact can have, for example, a lock-and-key configuration, a peg-in-a-hole configuration, a disk-in-a-slot configuration, or any other suitable male-female configuration.

A mandrel contact can be, for example, a taper acceptor, a tapered member, a cylinder acceptor, a cylindrical member, a cube acceptor, a cubical member, a channel, a rectangular member, an annular groove, or an annular member. These configurations can also include alignment components such as keys or alignment pins. The terms "member" and "acceptor" refer to complementary male-female components. A mold-body contact is complementary to the corresponding mandrel contact.

FIG. 7 illustrates another embodiment of a processing mold of the invention taken along the same cross section shown in FIG. 1B. As shown in FIG. 7, a second mandrel contact 120 is complementary to a second mold-body contact 62 of a mandrel 36 and is suitable for engaging at least a portion of a second end 52 of a mandrel 36.

In this embodiment, the second mandrel contact 120 includes a taper acceptor, and the second mold-body contact 62 of a mandrel 36 includes a tapered member.

In another embodiment, a second mandrel contact includes a cylinder acceptor, and a second mold-body contact of a mandrel includes a cylindrical member.

A first mandrel contact 82 can be independent of a second mandrel contact 120. Similarly, a first mold-body contact 60 can be independent of a second mold-body contact 62.

FIG. 7 shows that when a first mold-body contact 60 of a mandrel 36 engages a first mandrel contact 82 and a second mold-body contact 62 of a mandrel 36 engages a second mandrel contact 120, the first mold support 84 meets the second mold support 122 to define the tire-support region 38 with the mandrel wall 56. This typically occurs at a parting line 150. A parting line is a term known to one of skill in the art and refers to the area along which the first mold body is separated from the second mold body. In one embodiment, the parting line 150 is determined by a second end 92 of a first support wall 90 of a first mold body 32 meeting a second end 144 of a second support wall 142 of a second mold body 34.

One advantage of a mandrel 36 interconnecting a first mold body 32 and a second mold body 34 through mandrel contacts 82, 120 and mold-body contacts 60, 62 is that the mandrel can align the first mold body 32 and the second mold body 34. That is, a first mandrel contact 82 and a first mold-body contact 60 can engage a mandrel 36 with a first mold body 32, and a second mandrel contact 120 and a second mold-body contact 62 can engage a mandrel 36 with a second mold body 34, thereby positioning the first mold body 32 and the second mold body 34 relative to the mandrel 36. Accordingly, a processing mold of the invention can be free of alignment components such as, for example, a bushing, an alignment pin, or a taper lock, external to a tire-support region 38.

This use of a mandrel for alignment can be advantageous because there is a greater likelihood that the inner dimension of the tire support has substantially the same center as the outer dimension of the tire support as compared to a mold that uses only alignment components external to the tire-support region 38.

A second mold body 34 also includes a second mold support 122 as shown in FIG. 3 and FIG. 7. A mold support is as defined above. A mold support includes any configuration and arrangement suitable for providing at least a portion of a tire support. A mold support includes at least a support end but typically includes a support end and a support wall.

A support end includes any configuration suitable for defining a side of a tire support, for example, a first side 17 or a second side 18 of a tire support 10 as shown in FIG. 2A. A support end can be, for example, configured as a washer shape or a disk shape.

A support wall includes any configuration suitable for defining at least a portion of a tread-support surface of a tire support, for example, tread-support surface 14 of a tire support 10 as shown in FIG. 2A. A support wall can be, for example, configured as annular, circular, cylindrical, or elliptical.

A support wall is typically circumferentially spaced from a mandrel wall. The term "circumferentially spaced" as used herein includes surrounding, forming a ring around, or enclosing. One skilled in the art having read this specification will appreciate that the support wall is not limited to a perfect geometric shape but includes any shape suitable for providing at least a portion of a tread-support surface, for example, tread-support surface 14 in FIG. 2A.

In FIG. 3, one mold plate 118 includes a second mold support 122. A second mold support 122 includes a second support end 140 and a second support wall 142. A second end 144 of a second support wall 142 is spaced between a first end 146 of the second support wall 142 and a first mold body 32.

A second support end 140 typically interconnects a second mandrel contact 120 and a first end 146 of a second support wall. A second support end 140 can include a second tire-support member 100B as shown in FIG. 5A. A tire-support member is as defined above.

FIGS. 5B and 5C illustrate two possible configurations of tire-support members in a closed processing mold of the invention. FIG. 5B shows a cross section of the trapezoidal pillars 100A, 100B of FIG. 5A. This cross section is taken in the direction of line 5B illustrated in FIG. 13B. FIG. 5C illustrates pillars 100A, 100B that have stepped sides in a cross section similar to FIG. 5B.

FIG. 5A also shows another embodiment of a second mold body 34. In this embodiment, a second mold body 34 includes two mold plates 118, 119. A first mold plate 118 includes a second support end 140, and the second mold plate 119 includes a second support wall 142. The first and second mold plates 118, 119 can be attached by, for example, a bolt, a screw, or other attachment members.

As shown in FIG. 3 and FIG. 5, a second mold body 34 also includes an aperature defining an inlet 124 adjacent to a second mandrel contact 120. An inlet includes any configuration and arrangement that can receive polymeric material. An inlet can have any shape suitable for receiving polymeric material and for supplying polymeric material to the distribution port.

A second mold body 34 also includes a distribution port 126. A distribution port 126 is in fluid communication with an inlet 124, and a distribution port includes any configuration and arrangement suitable for distributing polymeric material to a tire-support region. For example, a distribution port 126 can include at least one channel 128 in fluid communication with an inlet 124 and a tire-support region 38. A channel can be, for example, linear, curved such as S-shaped, stepped, branched, annular, disk shaped, arc containing, or a combination of these configurations.

FIG. 1B illustrates one embodiment of a distribution port 126 with four linear channels 128.

Referring to FIGS. 8A-8E, a channel can be internally shaped like, for example, a C-shaped groove (FIGS. 8A and 8B), a V-shaped groove (FIG. 8C), a U-shaped groove (FIG. 8D), a trough-shaped groove (FIG. 8E), or any other shape suitable for distributing polymeric material to a tire-support region.

FIGS. 8B to 8E reflect a configuration in which a mandrel engages flat against the channel 128. But a mandrel 36 can be constructed such that the second end 52 of the mandrel 36 mates with at least some portion of the distribution port 126. For example, FIG. 8A illustrates a channel 128 from a distribution port 126 that is mated by a channel 129 from a mandrel 36. A channel positioned in a mandrel and suitable for mating with a channel of a distribution port is not limited to being a mirror image of the channel of the distribution port. The configuration is such that polymeric material can be distributed to a tire-support region.

Figure 9A:
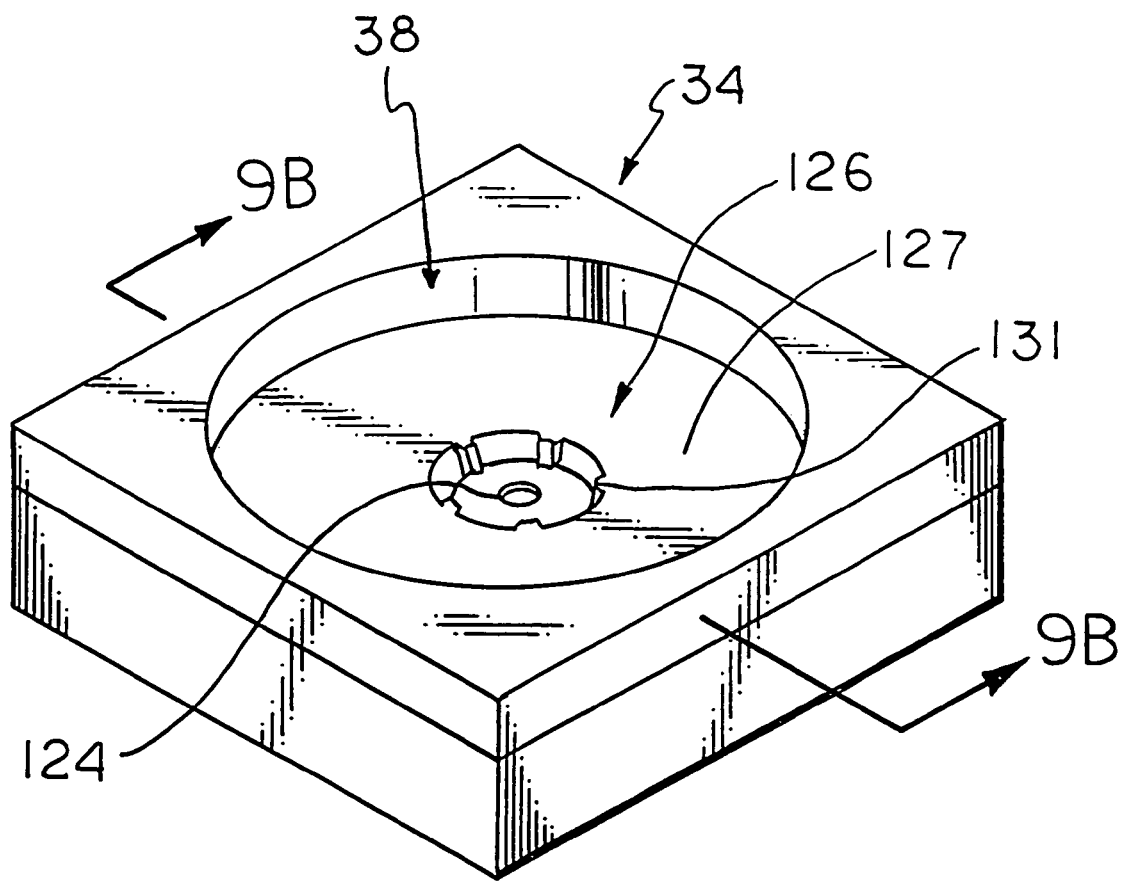
FIG. 9A illustrates a plan view of a second mold body having a distribution port that includes a disk-shaped channel.

FIG. 9A illustrates one example of a disk-shaped channel 127. This embodiment includes separation members 131 that separate the mandrel 36 from the second mold body 34 sufficiently to allow fluid communication between the inlet 124, the distribution port 126, and the tire-support region 38. A mandrel 36 suitable for engaging the second mold body 34 in FIG. 9A would have a second mold body contact 62 that is complementary to the separation members 131.

Figure 9B:
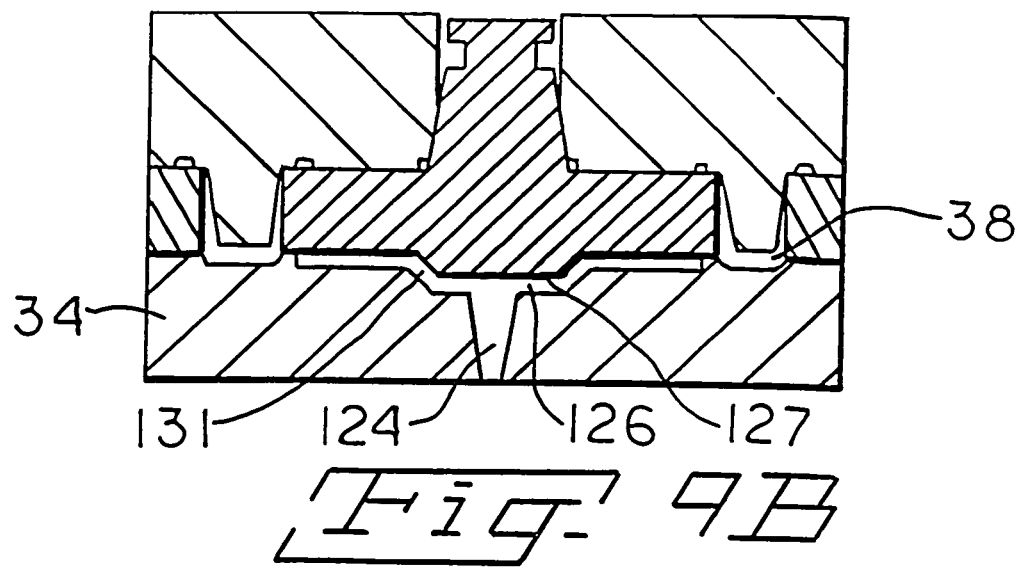
FIG. 9B illustrates a cross-sectional view of a processing mold having the second mold body of FIG. 9A, and the cross section is taken along line 9B in FIG. 9A.

FIG. 9B illustrates a cross-sectional view of a processing mold having the second mold body of FIG. 9A, and the cross section is taken along line 9B in FIG. 9A.

A channel is preferably dimensioned to facilitate a substantially uniform distribution of polymeric material to a tire-support region. A channel is typically dimensioned to maintain a desired pressure at a particular injection speed. Thus, factors to be considered when designing a channel include the type of polymeric material injected, the flow length (i.e., the distance between the inlet and the tire-support region), and the injection speed. One skilled in the art having read this specification would understand how to size a channel.

Similarly, the number of channels is preferably chosen to facilitate flow of polymeric material. For example, a distribution port can include at least one linear channel, preferably at least two linear channels, and more preferably at least four linear channels. If a distribution port includes at least two linear channels, preferably the channels are spaced equally from each other to deliver substantially even flow of polymeric material under substantially even pressure to the tire-support region of a processing mold.

In one embodiment, a distribution port includes four equally-spaced linear channels.

A distribution port can also include a combination of channels. For example, in one embodiment shown in FIG. 10, a distribution port includes four branched channels 132 in fluid communication with an inlet 124 and an annular channel 130. In this embodiment, the annular channel 130 is between the branched channels 132 and a second support end 140. Also in this embodiment, an inlet 124 distributes polymeric material into the branched channels 132, the branched channels 132 distribute polymeric material into the annular channel 130, and the annular channel 130 distributes polymeric material into a tire-support region 38.

A second mold body can also include a plaque reservoir. A plaque reservoir includes any configuration and arrangement suitable for preparing a plaque. For example, a plaque reservoir can be shaped as a dog bone, a rectangular strip, or a portion of a disk. A plaque can be useful for quality-control testing of prepared polymeric material. One skilled in the art having read this specification will recognize that a plaque reservoir can be included in other portions of a processing mold of the invention such as in the mandrel, in the first mold body, or a combination of the mandrel, the first mold body, and the second mold body.

Preferably a second mold body includes at least two symmetrically positioned plaque reservoirs.

Figure 10:
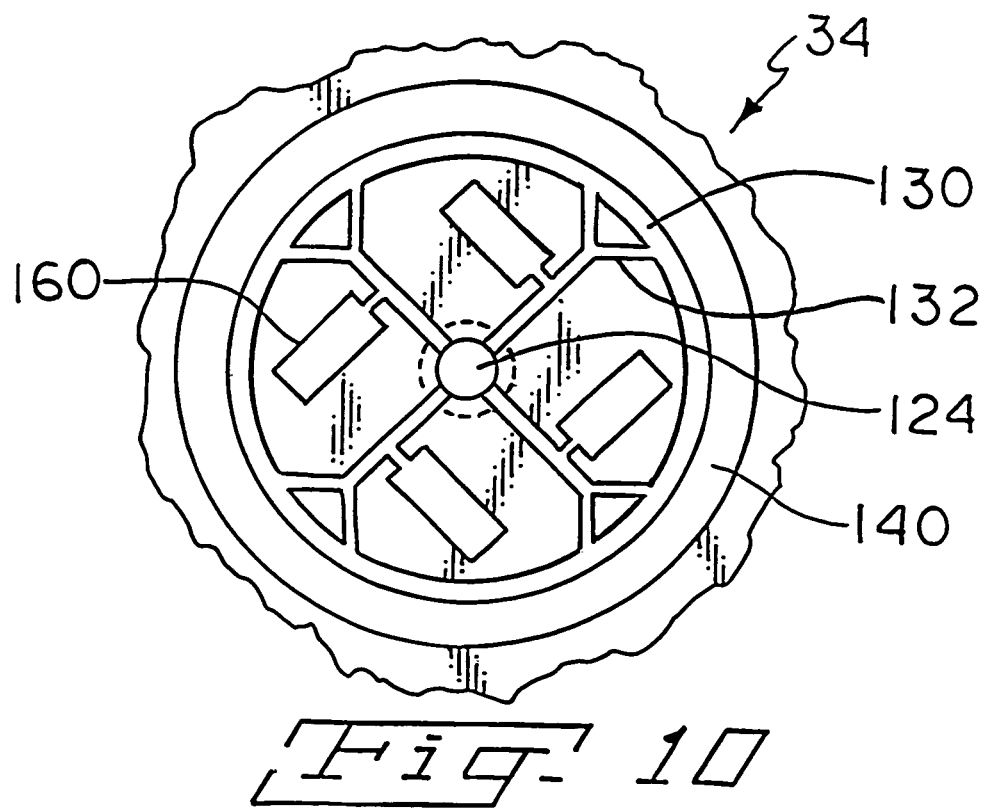
FIG. 10 illustrates a plan view of another embodiment of a second mold body having a distribution port that includes a combination of channels and a plaque reservoir.

In one embodiment shown in FIG. 10, one plaque reservoir 160 in the form of a rectangular strip is adjacent to each branched channel 132 such that each plaque reservoir 160 is in fluid communication with its adjacent channel 132.

It can be advantageous for a processing mold of the invention to include one or more plaque reservoirs because testing procedures such as, for example, quality-control procedures, can be conducted on polymeric material prepared from the same batch of polymeric material as that for a tire support. Also, plaque reservoirs can be covered up with a complementary insert when a plaque does not need to be produced, which can decrease polymeric-material waste and subsequently decrease production cost. One skilled in the art having read this specification will appreciate that an insert complementary to a plaque reservoir can fill in the plaque reservoir so polymeric material does not fill the plaque reservoirs. This can be done by known methods.

As shown in FIG. 7, a first mold body 32 and a second mold body 34 can be oriented such that a first mold body 32 is positioned above a second mold body 34 and a mandrel 36 is oriented substantially parallel to gravity. That is, a first mold body 32 is an upper mold body and a second mold body 34 is a lower mold body. This orientation can be suitable for filling a processing mold with a polymeric material in a direction substantially against gravity. One advantage of this orientation includes allowing air bubbles to orient toward the first mold body.

Tire-Support Region

As illustrated in FIG. 7, a tire-support region 38 is defined by a mandrel wall 56, a first support end 88, a second support end 140, a first support wall 90, and a second support wall 142. A tire-support region includes any configuration suitable for shaping a tire support. For example, a tire-support region can be configured to provide at least one of strength, compliance, or durability to a tire support such that the tire support does not collapse when relied on for a limited duration during run-flat conditions.

In general, the mandrel wall 56 defines the inner dimension 19 (see FIG. 2) of the tire-support region 38, and the support wall provided by the first mold support 84, the second mold support 122, or both define the outer dimension 20 (see FIG. 2) of the tire-support region 38. For example, in the embodiment shown in FIG. 7, the first support wall 90 and the second support wall 142 define the outer dimension 20 of a tire support (see FIG. 2). The first support end 88 and the second support end 140 define an internal configuration 16 for a tire support (see FIG. 2).

A processing mold of the invention can also include an overflow chamber in fluid communication with a tire-support region. An overflow chamber includes any configuration and arrangement suitable for receiving polymeric material from a tire-support region as it fills. A suitable overflow chamber includes, for example, an overflow channel, an overflow reservoir, or any other chamber suitable for holding polymeric material. Preferably an overflow chamber is positioned at or near the top of a tire-support region.

An overflow chamber can be dimensioned such that it can collect a sufficient amount of excess polymeric material but not so much polymeric material that polymeric material molded in an overflow chamber becomes excessively difficult to remove from a tire support. Preferably polymeric material molded in an overflow chamber can be broken away from a tire support, punched away from a tire support, or sheared off of a tire support.

A processing mold of the invention can include a plurality of overflow chambers. Alternatively, a processing mold of the invention can include a continuous overflow chamber that is circumferentially spaced from the mandrel.

In one embodiment shown in FIG. 7, a mandrel 36 includes an overflow chamber 170. This overflow chamber includes a channel 172 feeding into a reservoir 174 at an end of each channel 172 opposite the mandrel wall 56. Preferably the channel 172 bisects the reservoir 174. One skilled in the art having read this specification will recognize that the reservoir 174 can be initially included in the processing mold and then the channel 172 can be machined into the processing mold as required during a processing review of a molded tire support.

In another embodiment, a first mold body includes an overflow chamber. This overflow chamber includes a circular channel surrounding a first support wall and being in fluid communication with a tire-support region.

One skilled in the art will appreciate that the overflow chamber included with the mandrel and with the first mold body is not limited to the described configuration for these two embodiments. That is, a first mold body can include an overflow chamber having channels and reservoirs, and, independently, a mandrel can include an overflow chamber having a circular channel. Similarly, although less preferred because the overflow chamber could be filled before the tire-support region is filled, a second mold body can include an overflow chamber.

In still another embodiment, a first mold body can include a first portion of an overflow chamber and a second mold body can include a second portion of an overflow chamber such that the first portion and the second portion of the overflow chamber meet to form an overflow chamber.

An overflow chamber can be advantageous for providing a more uniform distribution of polymeric material than in a processing mold lacking an overflow chamber. Although this invention is not limited to any particular theory, one theory for this configuration creating a more uniform distribution of polymeric material is that air bubbles can be pushed into the overflow chamber when a tire-support region is being filled against gravity. This reduces the number of air bubbles that can be trapped in a tire support.

The processing mold of the invention can also include a release feature that can facilitate removing a molded tire support from the tire-support region. For example, at least a portion of a tire-support region can be configured to have a draft that deviates from zero degrees. Draft can be defined relative to the direction in which the first mold body 32 is separated from the second mold body 34. This separation occurs along a parting line as described above. A draft that is parallel to the direction of separation of the first and second mold bodies 32, 34 is defined as zero.

In one embodiment having a first mold body that is an upper mold body, a second mold body that is a lower mold body, and a mandrel that is substantially parallel to gravity, the direction of separation is substantially parallel to gravity. In this embodiment, any portion of the tire-support region that is parallel to gravity would have a draft of zero degrees. In this embodiment, preferably at least a portion of the tire-support region has a draft of at least ½ degree and more preferably at least 5 degrees.

In one embodiment shown in FIG. 5A, a first support end 88 of a first mold support 84 includes 24 tire-support members that are pillars 100A. Each pillar has a base 101, a tip 102, a first side 103A opposing a second side 103B, and a third side 104A opposing a fourth side 104B. Instead of being rectangular or cubicle, which would result in a draft of substantially zero degrees, the pillars are trapezoidal such that the tip is narrower than the base and each side has a draft of about 5 degrees. In another embodiment, the first and second sides 103A, 103B have a draft of 5 degrees and third and fourth sides 104A, 104B have a draft of 1 degree. In another embodiment, a first support wall, a second support wall, or both have a draft of about 5 degrees.

As another example of a release feature, a processing mold of the invention can include a lock-release member. A lock-release member includes any configuration and arrangement that facilitates keeping a tire support in a second mold body when a processing mold of the invention is opened. Yet a lock-release member is not so intrusive that a tire support cannot be removed from a processing mold of the invention.

When a polymeric material fills a tire-support region, a lock-release member can displace polymeric material from or add polymeric material to a tire support. A lock-release member can include, for example, a ring, a channel, a peg, a pin, a cubicle protrusion, cubicle indentation, a dimple, a cylindrical indentation, a cylindrical protrusion, or any other protrusion or indentation suitable for contributing to maintaining a tire support in a second mold body. One skilled in the art having read this specification would understand how to include a lock-release member in a processing mold of the invention.

A lock-release member can be advantageous for controlling the location of the part when the processing mold is opened. One example of a lock-release member 262 is shown in FIG. 13C. In this embodiment, the lock release member is a dimple.

In one embodiment, a first support end includes 24 trapezoid-shaped pillars, and the base of each pillar includes a dimple.

And as yet another example of a release feature, a processing mold of the invention can include an ejector device. An ejector device includes any device suitable for applying a force on a tire support to facilitate removal of a tire support from a tire-support region.

An ejector device includes, for example, an ejector pin or a stripper plate.

Figure 14:
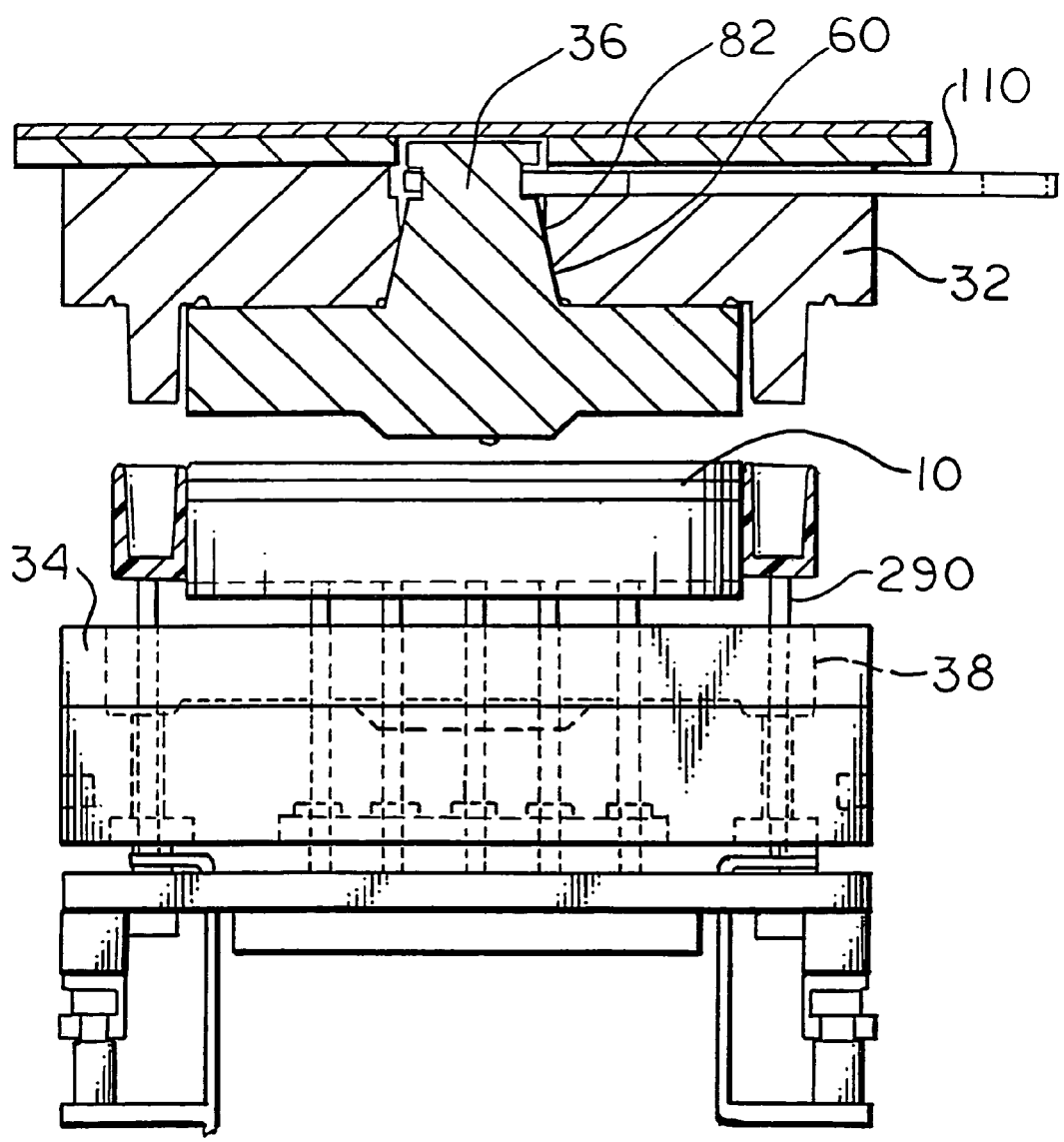
FIG. 14 illustrates a cross section of one embodiment of a processing mold of the invention similar to the cross section of FIG. 6B.

In one embodiment shown in FIG. 14, a processing mold of the invention includes ejector pins 290 adjacent a tire-support region 38.

In another embodiment shown in FIG. 11A, a processing mold of the invention includes a second mold body 34 having four movable mold plates 180, 181, 182, 183 that define the outer dimension of a tire support such as outer dimension 20 of tire support 10 in FIG. 2, a fifth mold plate 184 that defines a first or second side of a tire support, such as first side 17 or second side 18 of a tire support 10 in FIG. 2, and a sixth mold plate shown here as a stripper plate 185 between the four movable mold plates and the fifth mold plate. The four mold plates can be moved, and the stripper plate can be raised to facilitate release of the tire support from the fifth plate.

Figure 11B:
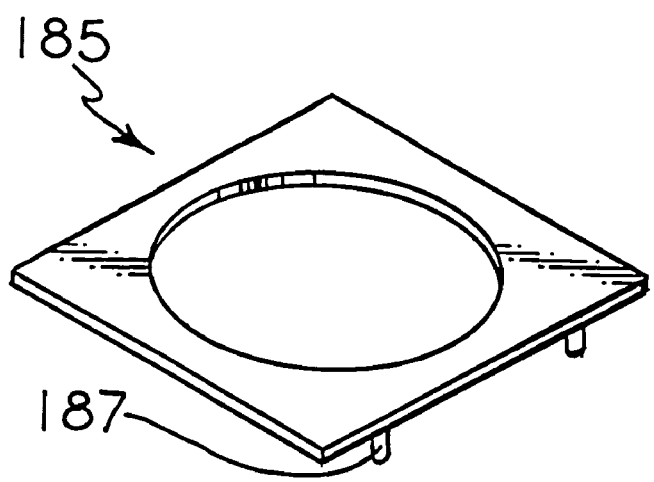
FIG. 11B illustrates a perspective view of a stripper plate, which can be used as an ejector device.

FIG. 11B further illustrates the stripper plate 185 of FIG. 11A. In this embodiment, the stripper plate includes attachment member 187, which can attach to the fifth mold plate 184.

Figure 11C:
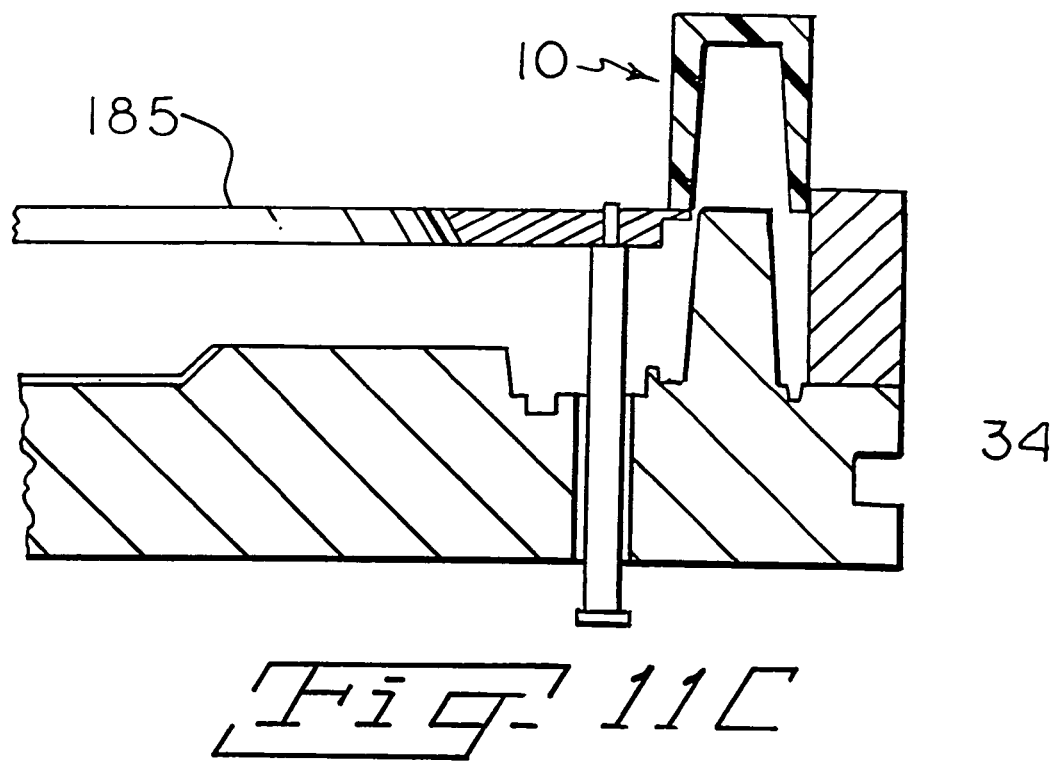
FIG. 11C illustrates a partial cross section of a processing mold similar to FIG. 13D.
Figure 11D:
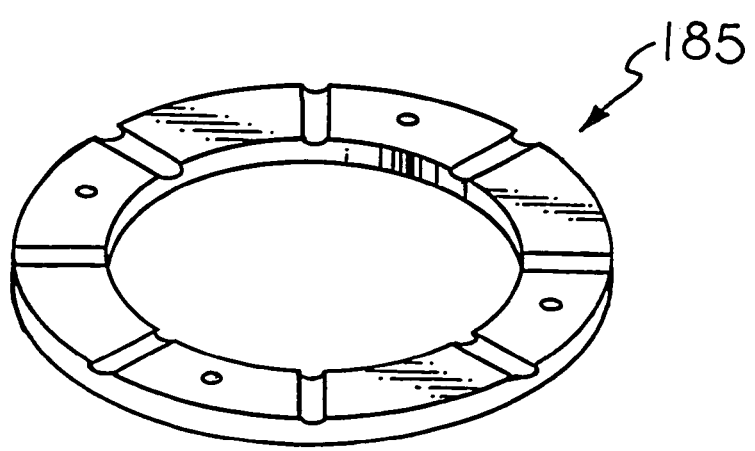
FIG. 11D illustrates a perspective view of a stripper plate, which can be used as an ejector device.

FIG. 11B shows a stripper plate that pushes on an outer dimension of a molded tire support to facilitate ejection of the molded tire support. Other conventional stripper plates can alternatively push on an inner dimension of a molded tire support to facilitate ejection of the molded tire support. One example of this type of stripper plate is illustrated in FIG. 11C. FIG. 11C illustrates a stripper plate 185 ejecting a tire support 10. FIG. 11D further illustrates the stripper plate 185 of FIG. 11C.

One skilled in the art having read this specification would understand how to include an ejector device in a processing mold of the invention.

One advantage of a processing mold of the invention is that the mandrel can be movable, and the mandrel can engage the first mold body, the second mold body, or both. Accordingly, the mandrel can alternate between engaging the first mold body and the second mold body when the processing mold of the invention is open. For example, before closing the processing mold of the invention, the second mandrel contact can engage the second mold-body contact, thereby engaging the mandrel and the second mold body. But the processing mold of the invention can be closed having the first mandrel contact engage the first mold-body contact and the second mandrel contact engage the second mold-body contact. The engagement between the first mold-body contact and the first mandrel contact can be locked, which then allows the mandrel to remain engaged with the first mold body when the processing mold of the invention is opened.

This can be advantageous because it can facilitate preparing a tire support with a tire-support reinforcement, for example, a tire-support reinforcement added to a processing mold of the invention.

This can also be advantageous because it can facilitate releasing a tire support from a processing mold by stripping the mandrel from the tire support, which can facilitate removing the tire support from the second mold body.

Tire-Support Reinforcement

A processing mold of the invention can also include a tire-support reinforcement. A tire-support reinforcement includes any device suitable for reinforcing the polymeric material used to mold the tire support. Examples of a tire-support reinforcement include fiberglass mat, steel fibers, carbon fibers, or a combination of these reinforcements.

One example includes a relatively flexible tire-support reinforcement. Such a reinforcement can be a fiberglass/stainless steel scrim cloth (such as AF-45" material available from d'A. Chromarat & Cie in France) that is wrapped at least two times to form a cylindrical wrap and then cut into cylindrical structures, which are the reinforcements.

Another example includes a unitary, rigid tire-support reinforcement. Such a reinforcement includes a plurality of filaments or layers that are sufficiently coupled together mechanically or chemically (e.g., with coatings such as binders or adhesives), such that the filaments or layers can be held together without substantial delamination. By being rigid, the reinforcement generally deforms no more than about 20%, preferably no more than about 10%, more preferably no more than about 5%, and even more preferably no more than about 1% when dropped from about two meters high to a hard surface, such as concrete, when the tire-support reinforcement is oriented upright similar to the orientation of the tire support in FIG. 2A. Such a reinforcement can be made by, for example, filament winding, and can be chemically coupled with, for example, epoxy resin (e.g., DERAKANE available from The Dow Chemical Company), polyurethane resin, polyester resin, and phenolic resin.

In one embodiment shown in FIG. 12, the tire-support region 38 includes a tire-support reinforcement 190. To prepare a tire support with a tire-support reinforcement 190, a mandrel 36 engages a second mold body 34, the tire-support reinforcement 190 is applied around the mandrel wall 56, the processing mold of the invention is closed, and polymer is injected into the processing mold. As the polymer fills the tire-support region 38, it substantially encapsulates the tire-support reinforcement 190 and molds the tire-support reinforcement into the tire support. The tire support, including the tire-support reinforcement, can be removed from the processing mold.

When a tire-support reinforcement is molded into a tire support using a processing mold according to the invention, the processing mold should be designed to accommodate the tire-support reinforcement.

When molding polymeric material into a tire support, the molded tire support generally shrinks toward the mandrel wall such that the final support is typically smaller than the tire-support region. This effect will generally be referred to as mold shrinkage. To compensate for mold shrinkage, the tire-support region is generally designed to be larger than the molded tire support. The amount of mold shrinkage typically depends on the type of polymeric material used, the processing conditions, and the type of tire-support reinforcement used, if any, in the polymer. Many polymeric materials are nearly isotropic in their mold shrinkage. That is, the material has substantially uniform properties in all directions, which results in nearly uniform shrinkage of the material. To compensate for the mold shrinkage of materials having isotropic shrinkage, the tire-support region is typically scaled globally by a single shrinkage factor.

Although some types of reinforced polymers are nearly isotropic in nature, which allows for the tire-support region to be scaled globally by a single shrinkage factor, a tire-support reinforcement generally reduces the amount of mold shrinkage of polymeric material that includes a tire-support reinforcement as compared to a polymeric material that does not include a tire-support reinforcement. A tire-support reinforcement can have characteristics, for example, fiber alignment, that can lead to nonisotropic shrinkage of a polymeric material. Nonisotropic shrinkage refers to the material having shrinkage that differs in at least one direction as compared to the other directions.

One example of a tire-support reinforcement that can lead to nonisotropic shrinkage includes a reinforcement having a mat of a plurality of circumferential glass fibers and circumferential steel fibers and a plurality of longitudinal glass fibers that are placed at 90° relative to the circumferential fibers. These fibers can be treated to facilitate adhesion of polymeric material to the fibers.

When a tire-support reinforcement that can lead to nonisotropic shrinkage is used, the distribution of mold shrinkage throughout the tire-support region must be calculated or experimentally determined to properly size the tire-support region so that a tire support having the desirable final dimensions is prepared.

In one embodiment, a tire-support reinforcement having a mat of glass and steel fibers as described above is applied around a mandrel wall, but all other areas of the tire-support region are free of a tire-support reinforcement. The areas that are free of a tire-support reinforcement are generally characterized as substantially isotropic when polymeric material is injected into the processing mold, and the area that has the tire-support reinforcement is generally characterized as nonisotropic. The shrinkage of polymeric material is typically less in the nonisotropic area than in the isotropic areas. The overall amount of shrinkage can depend on a variety of factors. For example, the amount of tire-support reinforcement, the placement of the tire-support reinforcement in the processing mold, the stiffness imparted by the tire-support reinforcement, or the direction in which the tire-support reinforcement is oriented. Many of these properties arise as a function of the final properties desired for the tire support.

Generally the isotropic areas have greater shrinkage than the nonisotropic area. And because the tire-support reinforcement imparts stiffness to the tire support, the nonisotropic area significantly resists shrinkage. This resistance can result in the tire support having an internal stress and an amount of mold shrinkage that differs from what would be expected from a tire support molded without a reinforcement or from what would be expected from a tire support molded with a reinforcement present throughout the tire support. This can yield a wide variation of material properties and shrinkage across the tire support.

To determine the dimension of the tire-support region that is needed to provide a tire support having a desired dimension, several factors such as the properties of the polymeric material such as mold shrinkage, stiffness, and Poisson's Ratio, the properties of the reinforcement such as stiffness and coefficient of thermal expansion, the placement and direction of the reinforcement, the amount of the reinforcement, and processing conditions such as temperatures and pressures are generally considered.

Although one skilled in the art can generally determine the appropriate dimension of the tire-support region, one method that can be used to determine the mold dimensions is through the use of numerical analysis. Numerical analysis is the use of mathematical relationships to predict shrinkage of the tire support. Numerical analysis takes into account the shrinkage of polymeric material and the reinforcement when molded together. This analysis can be performed manually or through the used of computer-aided engineering. Computer-aided engineering facilitates making the calculations directed to mold shrinkage. One skilled in computer-aided engineering can use a basic programming language such as Fortran or a commercial finite-element-analysis code such as MSC Nastran (MSC Software), Abaqus (Hibbitt Karlsson & Sorensen, Inc.; Pawtucket, R.I.), or Ansys, Inc. to assist in numerical analysis of the shrinkage. For example, factors identified above and the shape of the desired tire support can be processed by, for example, Patran (MSC Software) or Hypermesh (Altair), into a finite-element model, which can be used in a finite-element-analysis code. The finite-element-analysis code can calculate the mold shrinkage from the model, and the mold shrinkage is added to the dimensions for the tire-support region.

Detailed Description of an Illustrated Embodiment of a Processing Mold of the Invention Illustrated embodiments of a processing mold of the invention will be described with reference to the Figures. Like reference numerals represent like parts and assemblies throughout the several views. Reference to the drawings is not intended to limit the scope of the invention.

Figure 13B:
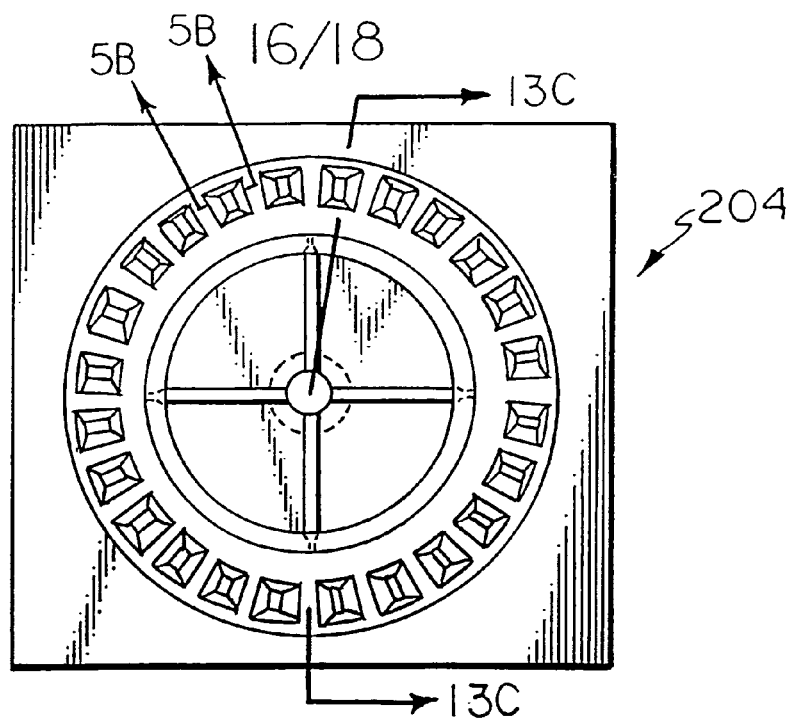
FIG. 13B illustrates a plan view of the second mold body of FIG. 13A.
Figure 13C:
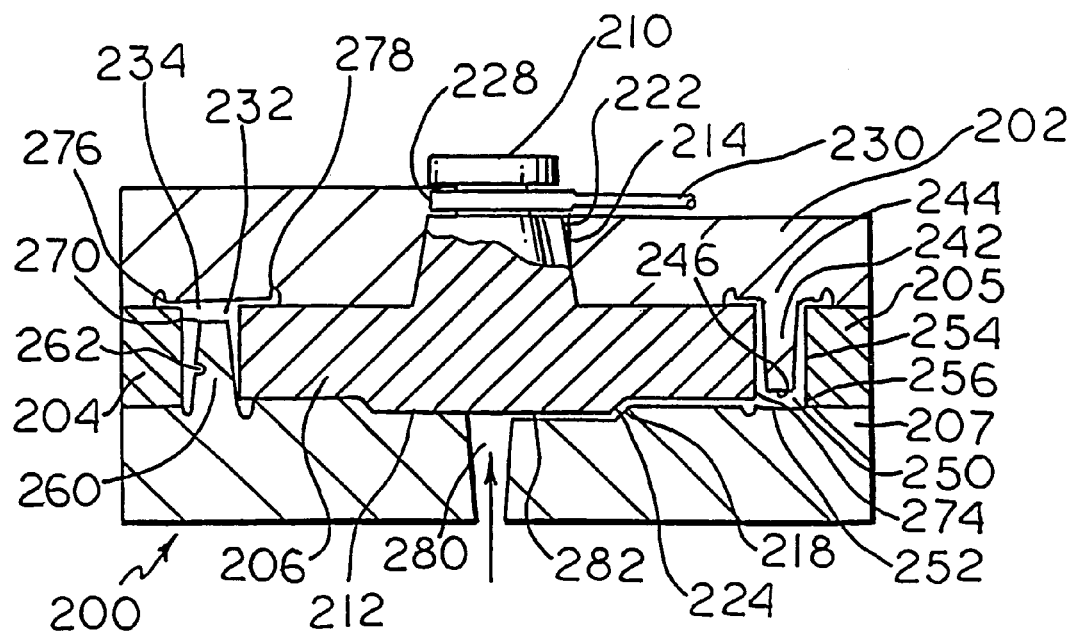
FIG. 13C illustrates the closed processing mold of FIG. 13A having a cross section taken along line 13C in FIG. 13B.

FIG. 13A shows an exploded view of one embodiment of a processing mold 200 of the invention. This embodiment is suitable for preparing a tire support as illustrated in FIG. 2. FIG. 13B illustrates a plan view of the second mold body 204 of FIG. 13A. FIG. 13C illustrates the closed processing mold of FIG. 13A having a cross section taken along line 13C in FIG. 13B.

FIG. 13A shows a first mold body 202 opposing a second mold body 204 and also shows a mandrel 206 having a mandrel body 208 interconnecting a first end 210 and a second end 212. The second mold body 204 includes two mold plates 205, 207. A first mold plate 205 defines a tread-support surface, for example, tread-support surface 14 of tire support 10 in FIG. 2. A second mold plate 207 defines a first or second side, for example, a first side 17 or a second side 18 for tire support 10 in FIG. 2.

FIG. 13C shows that the mandrel 206 aligns the first and second mold bodies 202, 204. This embodiment is free of other alignment components such as mating tapers and pins and bushings. But one of skill in the art having read this specification will recognize that a processing mold of the invention can include other alignment components, for example, external to the tire-support region.

In FIGS. 13A and 13C, the first mold body 202 includes a first mandrel contact 214, which is a taper acceptor in this embodiment. The second mold body 204 includes a second mandrel contact 218, which is a taper acceptor in this embodiment.

The first end 210 of the mandrel 206 includes a first mold-body contact 222, which is a taper member in this embodiment. The first mold-body contact 222 is engaged with the first mandrel contact 214 in FIG. 13A.

In FIG. 13C, the second end 212 of the mandrel 206 includes a second mold-body contact 224, which is a taper member in this embodiment. The second mold-body contact 224 is engaged with the second mandrel contact 218.

FIG. 13C also shows that the mandrel 206 engages both the first mold body 202 and the second mold body 204 when the processing mold of the invention is closed. That is, the first mold-body contact 222 engages the first mandrel contact 214, and the second mold-body contact 224 engages the second mandrel contact 218.

FIG. 13C also illustrates one advantage of a processing mold of the invention. In FIG. 13C, the mandrel 206 is locked to the first mold body 202. That is, the mandrel 206 engages the first mold body 202 through a first mold-body contact 222 engaging a mandrel contact 214 to form an engagement 228. The engagement 228 is then locked together through a locking member 230 adjacent to the first mold body 202.

A processing mold of the invention also includes a mold support. FIG. 13C shows a first mold body 202 that includes a first mold support 232. The first mold support 232 includes a first support end 234.

The first support end 234 includes multiple tire-support members, which are pillars 242 having a base 244 and a tip 246 in this embodiment, for defining an internal configuration of the tire support between the wheel-rim surface and the tread-support surface.

FIG. 13C also shows a second mold body 204 that includes a second mold support 250. The second mold support 250 includes a second support end 252 and a second support wall 254. The second support wall 254 is radially spaced from the mandrel 206, and the second support wall 254 defines a tread-support surface, for example, tread-support surface 14 of tire support 10 in FIG. 2.

The second support end 252 interconnects the second mandrel contact 218 and the first end 256 of the second support wall 254. The second support end 252 includes multiple tire-support members 260 for defining an internal configuration of the tire support between the inner dimension and the outer dimension of the tire support.

The tire support members in FIG. 13C are trapezoidal pillars 242, 260. Each pillar has a tip 246 and an opposing base 244. The tire-support members 260 included in the second mold body 204 each have a lock-release member 262. In this embodiment, the lock-release member 262 is a dimple.

A processing mold of the invention can be closed to define a tire-support region 270 as shown in FIG. 13C. FIG. 13C illustrates that when a processing mold of the invention 200 is closed, the first mold support 232 and the second mold support 250 mate to define a tread-support surface, a first side, and a second side of a tire support. The mandrel wall 274, first support end 234, second support end 252, and the second support wall 254 define a tire-support region 270.

A processing mold of the invention can also include an overflow chamber. FIGS. 13A and 13C shows a first mold body 202 including overflow chambers 276, 278.

A processing mold of the invention also includes an inlet 280, which is a sprue in this embodiment, and a distribution port 282.

FIG. 13D illustrates an enlarged partial cross section of a processing mold similar to FIG. 13C. FIG. 13D shows a first mold body 202, a second mold body 204, and a mandrel 206. The second mold body 204 includes two mold plates 205, 207. A first mold plate 205 defines a tread-support surface, for example, tread-support surface 14 of tire support 10 in FIG. 2. A second mold plate 207 defines a first or second side, for example, a first side 17 or a second side 18 for tire support 10 in FIG. 2. The second mold body also includes an ejector pin 290.

The first mold body 202, the second mold body 204, and the mandrel 206 define a tire-support region 270.

FIG. 13D also shows a distribution port 282. The distribution port 282 includes a linear channel 292 and an annular channel 294. When polymeric material fills a processing mold of the invention, it can flow through the linear channel 292, which is a spoke runner in this embodiment, flow into the annular channel 294, which is a radial runner in this embodiment, and into the tire-support region 270. In this embodiment, the polymeric material flows through a radial gate 296, which is included with the annular channel 294.

Method for Preparing a Tire Support

A tire support can be prepared in a processing mold of the invention by reaction injection molding (RIM). RIM can be carried out according to known methods. Generally RIM includes a method of using polymerization of low viscosity monomers or oligomers in a processing mold to prepare plastic parts. The low viscosity monomers or oligomers are typically metered into an impingement mixhead and then delivered to a processing mold. This can be done by any metering device know in the art such as, for example, a Krauss Maffei KK 120 metering machine.

The low viscosity monomers or oligomers that are typically useful with RIM include, for example, urethanes, ureas, nylon 6, dicyclopentadiene, polyesters, acrylamates, and epoxies.

To prepare a tire support, preferably the low viscosity monomers or oligomers include a polyurethane material. Polyurethane material includes polyisocyanates and polyols.

One example of a suitable polyurethane material includes an isocyanate prepolymer such as methylene diphenyl isocyanate, polyether polyols such as copolymers of propylene oxide or copolymers of mixtures of ethylene oxide and propylene oxide, and a diamine chain extender such as diethyl toluene diamine.

PCT publication WO 01/42000 describes polyurethane-polymer compositions that are particularly useful for making a lightweight tire support. Example 1 of this PCT publication describes one composition that is particularly useful. In Example 1, a polyurethane-polymer composition was prepared by admixing a polyol-side stream and an isocyanate-side stream using reaction injection molding.

The polyol-side stream included a polyol formulation. The polyol formulation included a polyol in an amount of 54.81 weight percent, a chain extender in an amount of 44.84 weight percent, a surfactant in an amount of 0.25 weight percent, and a catalyst in an amount of 0.1 weight percent.

For the polyol formulation, the polyol was an ethylene-oxide capped 5,000 molecular-weight triol having a maximum unsaturation of 0.035 milliequivalents per gram of the total composition (available from The Dow Chemical Company, Freeport, Tex.). The chain extender was diethyl toluene diamine (a mixture of 3,5-diethyl-2,4- and 2,6'-toluene diamines) (available from The Dow Chemical Company, Freeport, Tex.). The surfactant was a silicone surfactant (L-1000; available from OSI Specialties/Witco Corp., Chicago, Ill.). The catalyst included a 50:50 combination of triethylene diamine (Dabco 3LV) (available form Air Products and Chemicals, Inc., Allentown, Pa.) and dibutyl tin dilaurate (Fomrez UL28) (available from Witco Chemical Co., Chicago, Ill.).

The isocyanate-side stream included a prepolymer formulation. The prepolymer formulation included a first isocyanate in an amount of 31.83 weight percent, a polyol in an amount of 63.17 weight percent, and a second isocyanate in an amount of 5.0 weight percent.

For the prepolymer formulation, the first isocyanate was 98 percent pure p,p'-MDI (Isonate 125M) (available from The Dow Chemical Company, Freeport, Tex.). The polyol was an ethylene-oxide capped (15 percent) 6,000 molecular weight triol with a maximum unsaturation of 0.02 milliequivalent per gram of total composition (available from Asahi). And the second isocyanate was 50 percent p,p'-MDI and 50 percent o,p-MDI (Isonate 50OP) (available from The Dow Chemical Company, Freeport, Tex.).

The isocyanate-side stream and the polyol-side stream were combined in a weight-ratio blend of 2.15:1 (isocyanate to polyol) using standard reaction-injection-molding processing conditions.

One skilled in the art will recognize that this formulation can be modified to alter properties of the tire support such as altering the ratio of chain extender and polyol, eliminating a second isocyanate, and using polyols that are not ethylene-oxide capped.

To prepare a tire support from a polyurethane material, a polyether polyol and an isocyanate prepolymer can be metered into an impingement mixhead (not shown). The impingement mixhead can then feed the polyurethane material into a processing mold of the invention through an inlet included in a second mold body.

The head pressure used to fill the processing mold is typically great enough to facilitate mixing of monomers or oligomers but not so great as to result in equipment failure. The head pressure used to fill the processing mold is typically no greater than 3500 psi, preferably no greater than 2000 psi, and is typically at least 500 psi, preferably at least 1000 psi.

The temperature of monomers or oligomers is typically controlled to facilitate mixing of all components but the temperature should not be so high that the polymeric reaction happens so quickly that the processing mold does not fill properly.

Preferably the processing mold of the invention includes a second mold body positioned below a first mold body and a mandrel having a longitudinal axis substantially parallel to gravity. The first mold body and the second mold body can be aligned by a mandrel. A closed processing mold can be held together and supported by known means. For example, a closed processing mold can be clamped to hold the mold together during injection of monomers or oligomers.

The polyurethane material is charged into the inlet. It flows from the inlet through the distribution port and then into the tire-support region. The polyurethane material then fills the tire-support region from the second support end to the first support end. That is, from the bottom of the processing mold to the top of the processing mold.

In an embodiment having an overflow chamber, the excess polyurethane material feeds from the tire-support region into the overflow chamber, preferably pushing at least a portion of any air bubbles into the overflow chamber. Excess polyurethane material includes an amount of polyurethane material beyond an amount of polyurethane material effective for filling a tire-support region.

After filling the tire-support region, the mixhead can be closed, and the polyurethane material can be allowed to set for a time sufficient to develop green strength, typically no longer than 5 minutes, preferably no longer than 3 minutes, and more preferably no longer than 1 minute.

After the tire support has been prepared in the processing mold, the first mold body can be separated from the second mold body, and the tire support can be removed. The tire support can be allowed to cure in the processing mold or after removal from the tire support. One advantage of allowing the tire support to cure after removal is that more tire supports per unit time can be prepared from a single processing mold, which allows for faster production time.

The processing mold is opened to remove a tire support. In one embodiment shown in FIG. 14, the mandrel 36 can be locked to the first mold body 32 by having a locking member 110 of the first mold body 32 lock an engagement between a first mandrel contact 82 and a first mold-body contact 60. Accordingly, when the processing mold is opened, the mandrel 36 can remain engaged with the first mold body 32, and the mandrel 36 can be separated from the second mold body 34. But the tire support 10 preferably remains adjacent to the second mold body 34. This can be advantageous because the tire support can be selectively directed to remain with the second mold body 34. Ejector pins 290 can be useful to facilitate releasing the tire support 10 from the second mold body 34 and the tire-support region 38. One skilled in the art having read this specification will recognize that the ejector pins can be replaced by a stripper plate, and the stripper plate can be useful to facilitate releasing the tire support from the second mold body and the tire-support region.

In one embodiment, the tire-support reinforcement is applied to a processing mold of the invention and the tire-support reinforcement is molded into a tire support. To apply a tire-support reinforcement, a processing mold of the invention is open, and a mandrel is engaged with a second mold body through a second mold-body contact engaging a second mandrel contact. A tire-support reinforcement is applied to the mandrel such that the tire-support reinforcement surrounds at least a portion of a mandrel wall. That is, a tire-support reinforcement is applied adjacent to a mandrel wall. The term "applied" as used herein includes pulling onto, dropping onto, fitting onto, snugging onto, and inching onto.

In one embodiment, a tire-support reinforcement is pulled onto a mandrel.

In another embodiment, a tire-support reinforcement is dropped onto a mandrel.

In still another embodiment, a tire-support reinforcement is applied by an automated process.

It will be apparent to one of ordinary skilled in the art that many changes and modifications can be made in the invention without departing from the spirit or scope of the claims.

What is claimed is:

1. A method of forming a run flat tire support, the method comprising:
   a. placing and contacting a unitarily moveable mandrel within a first mold body;
   b. contacting and fixing a second mold body to the first mold body and mandrel wherein the mandrel, first and second mold bodies form a mold cavity in the shape of a run flat tire support, and further wherein said mandrel engages both the first and second mold bodies such that when said mandrel is locked to the first mold body, the mandrel remains with the first mold body when the first and second mold bodies are separated and when said mandel is not locked to the first mold body, the mandrel remains with the second mold body when the first and second mold bodies are separated;
   c. introducing a polymeric material into the mold cavity to form the run flat tire support;
   d. selectively locking said mandrel to said first mold body;
   e. separating the first and second mold bodies and removing the run flat tire support, wherein said mandrel remains with the first mold body if said mandrel is locked to the first mold body, and said mandrel remains with the second mold body if said mandrel is not locked to the first mold body.

* * * * *